United States Patent
Matsuura et al.

(10) Patent No.: US 12,264,257 B2
(45) Date of Patent: Apr. 1, 2025

(54) COMPOSITION CONTAINING A FLUORINATED ETHER COMPOUND

(71) Applicant: AGC Inc., Tokyo (JP)

(72) Inventors: Keigo Matsuura, Tokyo (JP); Taiki Hoshino, Tokyo (JP); Kiyotaka Takao, Tokyo (JP); Makoto Uno, Tokyo (JP); Eiichiro Anraku, Tokyo (JP); Motoshi Aoyama, Tokyo (JP); Naoki Katsuki, Tokyo (JP); Yusuke Tomiyori, Tokyo (JP); Toyokazu Enta, Tokyo (JP); Hiromasa Yamamoto, Tokyo (JP)

(73) Assignee: AGC Inc., Tokyo (JP)

( * ) Notice: Subject to any disclaimer, the term of this patent is extended or adjusted under 35 U.S.C. 154(b) by 800 days.

(21) Appl. No.: 17/443,038

(22) Filed: Jul. 20, 2021

(65) Prior Publication Data

US 2021/0348024 A1    Nov. 11, 2021

Related U.S. Application Data

(63) Continuation of application No. PCT/JP2020/004645, filed on Feb. 6, 2020.

(30) Foreign Application Priority Data

Feb. 13, 2019  (JP) .................................. 2019-023690

(51) Int. Cl.
| | |
|---|---|
| *C09D 183/10* | (2006.01) |
| *C09D 5/00* | (2006.01) |
| *C09D 7/20* | (2018.01) |
| *C09D 183/12* | (2006.01) |

(52) U.S. Cl.
CPC ............ *C09D 183/10* (2013.01); *C09D 5/00* (2013.01); *C09D 7/20* (2018.01); *C09D 183/12* (2013.01)

(58) Field of Classification Search
CPC ............................ C09D 183/10; C09D 183/12
See application file for complete search history.

(56) References Cited

FOREIGN PATENT DOCUMENTS

| | | |
|---|---|---|
| CN | 105838245 A | 8/2016 |
| CN | 109016719 A | 12/2018 |
| CN | 111315834 A | 6/2020 |
| JP | 2016-141699 A | 8/2016 |
| KR | 2016-0094266 A | 8/2016 |
| KR | 2018-0044282 A | 5/2018 |
| WO | WO 2017/022437 A1 | 2/2017 |
| WO | WO 2019/077947 A1 | 4/2019 |

OTHER PUBLICATIONS

Machine translation of JP 2016-141699, published Aug. 8, 2016.*
International Search Report issued Apr. 21, 2020 in PCT/JP2020/004645 filed on Feb. 6, 2020, 3 pages.

* cited by examiner

*Primary Examiner* — Vickey Nerangis
(74) *Attorney, Agent, or Firm* — Oblon, McClelland, Maier & Neustadt, L.L.P.

(57) ABSTRACT

The composition containing a compound represented by the formula (1) and a compound represented by the formula (2), $$R^{f1}-(OX^1)_{m1}-O-R^{f2}-Y^1-[Si(R^1)_{n1}L^1_{3-n1}]_{g1} \quad (1)$$

$$[L^2_{3-n2}(R^2)_{n2}Si]_{g2}-Y^2-R^{f3}-(OX^2)_{m2}-O-R^{f4}-Y^3-[Si(R^3)_{n3}L^3_{3-n3}]_{g3} \quad (2),$$

where $R^{f1}$ to $R^{f4}$, $X^1$ to $X^2$, $Y^1$ to $Y^3$, $R^1$ to $R^3$, $L^1$ to $L^3$, m1 to m2, n1 to n3, and g1 to g3 are as defined in the disclosure. An article, containing a substrate and a surface layer formed of the composition on the substrate.

20 Claims, No Drawings

COMPOSITION CONTAINING A FLUORINATED ETHER COMPOUND

TECHNICAL FIELD

The present invention relates to a composition and an article.

BACKGROUND ART

A fluorinated compound, which has high lubricity, water/oil repellency, etc., is suitably used for a surface treatment agent. By the surface treatment agent, water/oil repellency is imparted to the surface of a substrate, whereby stain removability improves and stain on the substrate surface will easily be wiped off. Among fluorinated compounds, a fluorinated ether compound having a poly(oxyfluoroalkylene) chain having an ether bond (—O—) in a fluoroalkylene chain is a compound excellent in flexibility and is excellent particularly in oil and fat stain removability.

As the fluorinated ether compound, a compound having a poly(oxyperfluoroalkylene) chain, having a hydrolyzable silyl group at one terminal and having a hydrolyzable silyl group or an alkyl group which may have a fluorine atom at the other terminal, has been widely used (Patent Document 1).

PRIOR ART DOCUMENTS

Patent Document

Patent Document 1: WO2017/022437

DISCLOSURE OF INVENTION

Technical Problem

A surface treatment agent containing the fluorinated ether compound may be used, for example, as a surface treatment agent for a member constituting a plane to be touched with fingers or hands of e.g. a smartphone (for example, a display screen and a plane opposite to the display screen (rear side)).

In recent years, performance required for the surface layer to be formed by the fluorinated ether compound is becoming high. For example, when the surface layer is applied to a member constituting a plane to be touched with fingers, the surface layer is required to be excellent in performance (abrasion resistance) such that stain removability for oil and fat such as fingerprints is less likely to decrease even when rubbed repeatedly.

The present inventors have evaluated an article having a surface layer formed by using the fluorinated ether compound as described in Patent Document 1 on a principal plane of a substrate and as a result, found that the surface layer has favorable abrasion resistance but is inferior in sliding resistance (that is the article is likely to slide). For example, a smartphone, as an example of the membrane-provided substrate, may slip down and break when operated or placed on e.g. a desk.

Under these circumstances, the object of the present invention is to provide a composition with which a surface layer excellent in abrasion resistance and sliding resistance can be formed, and an article.

Solution to Problem

The present inventors have conducted extensive studies to achieve the above object and as a result, found that with a composition containing a fluorinated ether compound having a hydrolyzable silyl group only at one terminal and a fluorinated ether compound having a hydrolyzable silyl group at each terminal, wherein the ratio of the total number of moles of the groups represented by —$CF_3$ present at the terminal of the fluorinated ether compounds, to the total number of moles of the groups represented by —$CF_2$— present at a predetermined position in the fluorinated ether compounds, is within a predetermined range, a surface layer excellent in abrasion resistance and sliding resistance can be formed, and have accomplished the present invention.

That is, the present inventors have found that the above object can be achieved by the following constitutions.

[1] A composition comprising a compound represented by the formula (1) and a compound represented by the formula (2), wherein the ratio of the number of moles of the group represented by —$CF_3$ in $R^{f1}$ in the formula (1) to the total of the number of moles of the group represented by —$CF_2$— closest to $Y^1$ in $R^{f2}$ in the formula (1), the number of moles of the group represented by —$CF_2$— closest to $Y^2$ in $R^{f3}$ in the formula (2) and the number of moles of the group represented by —$CF_2$— closest to $Y^3$ in $R^{f4}$ in the formula (2), is from 0.001 to 0.1:

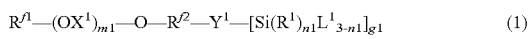
$$R^{f1}-(OX^1)_{m1}-O-R^{f2}-Y^1-[Si(R^1)_{n1}L^1_{3-n1}]_{g1} \quad (1)$$

wherein $R^{f1}$ is a linear perfluoroalkyl group,
$X^1$ is a fluoroalkylene group having at least one fluorine atom,
$R^{f2}$ is a fluoroalkylene group having a group represented by —$CF_2$—,
$Y^1$ is a (g1+1) valent linking group having no fluorine atom,
$R^1$ is a monovalent hydrocarbon group,
$L^1$ is a hydrolyzable group or a hydroxy group,
m1 is an integer of at least 2,
n1 is an integer of from 0 to 2, and
g1 is an integer of at least 1;

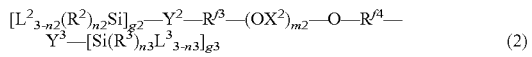
$$[L^2_{3-n2}(R^2)_{n2}Si]_{g2}-Y^2-R^{f3}-(OX^2)_{m2}-O-R^{f4}-Y^3-[Si(R^3)_{n3}L^3_{3-n3}]_{g3} \quad (2)$$

wherein $L^2$ and $L^3$ are each independently a hydrolyzable group or a hydroxy group,
$R^2$ and $R^3$ are each independently a monovalent hydrocarbon group,
$Y^2$ is a (g2+1) valent linking group having no fluorine atom,
$R^{f3}$ and $R^{f4}$ are each independently a fluoroalkylene group having a group represented by —$CF_2$—,
$X^2$ is a fluoroalkylene group having at least one fluorine atom,
$Y^3$ is a (g3+1) valent linking group having no fluorine atom,
n2 and n3 are each independently an integer of from 0 to 2,
g2 and g3 are each independently an integer of at least 1, and
m2 is an integer of at least 2.

[2] The composition according to [1], wherein $R^{f1}$ is a $C_{1-6}$ linear perfluoroalkyl group, $(OX^1)_{m1}$ is a poly(oxyfluoroalkylene) chain composed mainly of units based on a $C_{1-6}$ oxyperfluoroalkylene group, and $R^{f2}$ is a $C_{1-6}$ perfluoroalkylene group.

[3] The composition according to [1] or [2], wherein $(OX^2)_{m2}$ is a poly(oxyfluoroalkylene) chain composed mainly of units based on a $C_{1-6}$ oxyperfluoroalkylene group, and $R^{f3}$ and $R^{f4}$ are each independently a $C_{1-6}$ perfluoroalkylene group.

[4] The composition according to any one of [1] to [3], wherein m1 and m2 are each independently an integer of from 2 to 200.

[5] The composition according to any one of [1] to [4], wherein g1, g2 and g3 are each independently an integer of from 2 to 4.

[6] A composition comprising a compound represented by the formula (1), a compound represented by the formula (2) and a compound represented by the formula (3), wherein the ratio of the total of the number of moles of the group represented by —CF$_3$ in R$^{f1}$ in the formula (1), the number of moles of the group represented by —CF$_3$ in R$^{f5}$ in the formula (3) and the number of moles of the group represented by —CF$_3$ in R$^{f6}$ in the formula (3) to the total of the number of moles of the group represented by —CF$_2$— closest to Y$^1$ in R$^{f2}$ in the formula (1), the number of moles of the group represented by —CF$_2$— closest to Y$^2$ in R$^{f3}$ in the formula (2) and the number of moles of the group represented by —CF$_2$— closest to Y$^3$ in R$^{f4}$ in the formula (2), is from 0.001 to 0.1:

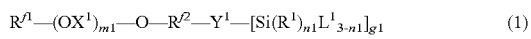

$$R^{f1}—(OX^1)_{m1}—O—R^{f2}—Y^1—[Si(R^1)_{n1}L^1_{3-n1}]_{g1} \quad (1)$$

wherein R$^{f1}$ is a linear perfluoroalkyl group,
X$^1$ is a fluoroalkylene group having at least one fluorine atom,
R$^{f2}$ is a fluoroalkylene group having a group represented by —CF$_2$—,
Y$^1$ is a (g1+1) valent linking group having no fluorine atom,
R$^1$ is a monovalent hydrocarbon group,
L$^1$ is a hydrolyzable group or a hydroxy group,
m1 is an integer of at least 2,
n1 is an integer of from 0 to 2, and
g1 is an integer of at least 1;

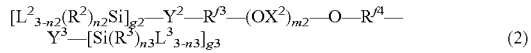

$$[L^2_{3-n2}(R^2)_{n2}Si]_{g2}—Y^2—R^{f3}—(OX^2)_{m2}—O—R^{f4}—Y^3—[Si(R^3)_{n3}L^3_{3-n3}]_{g3} \quad (2)$$

wherein L$^2$ and L$^3$ are each independently a hydrolyzable group or a hydroxy group,
R$^2$ and R$^3$ are each independently a monovalent hydrocarbon group,
Y$^2$ is a (g2+1) valent linking group having no fluorine atom,
R$^{f3}$ and R$^{f4}$ are each independently a fluoroalkylene group having a group represented by —CF$_2$—,
X$^2$ is a fluoroalkylene group having at least one fluorine atom,
Y$^3$ is a (g3+1) valent linking group having no fluorine atom,
n2 and n3 are each independently an integer of from 0 to 2,
g2 and g3 are each independently an integer of at least 1, and
m2 is an integer of at least 2;

$$R^{f5}—(OX^3)_{m3}—O—R^{f6} \quad (3)$$

wherein R$^{f5}$ and R$^{f6}$ are each independently a linear perfluoroalkyl group,
X$^3$ is a fluoroalkylene group having at least one fluorine atom, and
m3 is an integer of at least 2.

[7] The composition according to [6], wherein R$^{f1}$ is a C$_{1-6}$ linear perfluoroalkyl group, (OX$^1$)$_{m1}$ is a poly(oxyfluoroalkylene) chain composed mainly of units based on a C$_{1-6}$ oxyperfluoroalkylene group, and R$^2$ is a C$_{1-6}$ perfluoroalkylene group.

[8] The composition according to [6] or [7], wherein (OX$^2$)$_{m2}$ is a poly(oxyfluoroalkylene) chain composed mainly of units based on a C$_{1-6}$ oxyperfluoroalkylene group, and R$^{f3}$ and R$^{f4}$ are each independently a C$_{1-6}$ perfluoroalkylene group.

[9] The composition according to any one of [6] to [8], wherein (OX$^3$)$_{m3}$ is a poly(oxyfluoroalkylene) chain composed mainly of units based on a C$_{1-6}$ oxyperfluoroalkylene group, and R$^{f5}$ and R$^{f6}$ are each independently a C$_{1-6}$ linear perfluoroalkyl group.

[10] The composition according to any one of [6] to [9], wherein g1, g2 and g3 are each independently an integer of from 2 to 4.

[11] The composition according to any one of [6] to [10], wherein m1, m2 and m3 are each independently an integer of from 2 to 200.

[12] The composition according to any one of [1] to [11], which further contains a liquid medium.

[13] The composition according to [12], wherein the liquid medium contains an organic solvent, and the organic solvent has a boiling point of from 35 to 250° C.

[14] The composition according to [12] or [13], wherein the liquid medium contains a fluorinated organic solvent.

[15] An article, which comprises a substrate and a surface layer formed of the composition as defined in any one of [1] to [14] on the substrate.

Advantageous Effects of Invention

According to the present invention, it is possible to provide a composition with which a surface layer excellent in abrasion resistance can be formed, and an article.

DESCRIPTION OF EMBODIMENTS

In this specification, a compound represented by the formula (1) will be referred to as "compound (1)". Compounds represented by other formulae will be referred to in the same manner. A group represented by the formula (1-1A) will be referred to as group (1-1A). Groups represented by other formulae will be referred to in the same manner.

In this specification, the "alkylene group may have a group A" means that the alkylene group may have the group A between carbon atoms of the alkylene group, or may have the group A at the terminal, that is alkylene group-group A-.

In this specification, meanings of the terms are as follows.

A "bivalent organopolysiloxane residue" is a group represented by the following formula. In the following formula, R$^X$ is an alkyl group (preferably C$_{1-10}$) or a phenyl group. g is an integer of at least 1, preferably an integer of from 1 to 9, particularly preferably an integer of from 1 to 4.

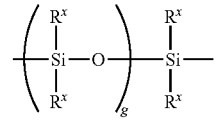

A "silphenylene skeleton group" is a group represented by —Si(R$^y$)$_2$PhSi(R$^y$)$_2$— (wherein Ph is a phenylene group, and R$^y$ is a monovalent organic group). R$^y$ is preferably an alkyl group (preferably C$_{1-10}$).

A "dialkylsilylene group" means a group represented by —Si(R$^z$)$_2$— (wherein R$^z$ is an alkyl group (preferably C$_{1-10}$)).

The "number average molecular weight" of a compound is calculated from the number (average value) of oxyfluoroalkylene groups on the basis of terminal groups by $^{1}$H-NMR and $^{19}$F-NMR.

[Composition]

The composition of the present invention will be described with reference to the respective embodiments.

First Embodiment

The composition according to a first embodiment of the present invention (hereinafter sometimes referred to as "composition (1)") contains the compound (1) and the compound (2), wherein the ratio of the number of moles of the group represented by —$CF_3$ in $R^{f1}$ in the formula (1) to the total of the number of moles of the group represented by —$CF_2$— closest to $Y^1$ in $R^{f2}$ in the formula (1), the number of moles of the group represented by —$CF_2$— closest to $Y^2$ in $R^{f3}$ in the formula (2) and the number of moles of the group represented by —$CF_2$— closest to $Y^3$ in $R^{f4}$ in the formula (2) (hereinafter sometimes referred to as ratio (1)) is from 0.001 to 0.1.

The number of moles of the group represented by —$CF_3$ means the number of moles of the group located at one terminal of the compound (1). Further, the total of the numbers of moles of the group represented by —$CF_2$— means the total of the number of moles of the group located in the vicinity of one terminal of the compound (1) and the number of moles of the group located in the vicinity of each terminal of the compound (2) in the composition. That is, a lower value of the ratio (1) means a higher content of the compound (2) in the composition, and higher value of the ratio (1) means a higher content of the compound (1) in the composition.

The group represented by —$CF_2$— closest to $Y^1$ in $R^{f2}$ in the formula (1) is, when $R^{f2}$ is a perfluoroalkylene group, —$CF_2$— adjacent to $Y^1$. Further, the same applies to the group represented by —$CF_2$— closest to $Y^2$ in $R^{f3}$ in the formula (2) and the group represented by —$CF_2$— closest to $Y^3$ in $R^{f4}$ in the formula (2).

In the composition (1), since the value of the ratio (1) is low, it is considered that the content of the compound (2) is sufficiently high as compared with the compound (1). The compound (2) has a reactive silyl group at each terminal. Accordingly, it is estimated that the reaction site between the composition (1) and the substrate increases, and adhesion between the surface layer and the substrate improves and as a result, the obtained surface layer is excellent in adhesion. Further, it is estimated that when the reactive silyl group at each terminal of the compound (2) is reacted with the substrate, each terminal of the molecule derived from the compound (2) is bonded to the substrate, and mobility of the molecule derived from the compound (2) decreases, and as a result, the obtained surface layer is excellent in sliding resistance.

The reactive silyl group means a hydrolyzable silyl group and a silanol group (Si—OH). As specific examples of the hydrolyzable silyl group, a hydrolyzable group as $L^1$ in the formula (1) described hereinafter, and a hydrolyzable group as $L^2$ and $L^3$ in the formula (2) described hereinafter, may be mentioned.

The hydrolyzable silyl group becomes a silanol group represented by Si—OH by hydrolysis reaction. Silanol groups will further undergo dehydration condensation reaction to form Si—O—Si bonds. Further, a silanol group will undergo dehydration condensation reaction with a silanol group present on the surface of the substrate to form a Si—O—Si bond.

<Compound Represented by Formula (1)>

The compound (1) is a fluorinated ether compound represented by the formula (1).

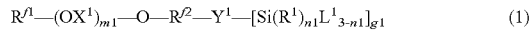

$R^{f1}$ is a linear perfluoroalkyl group.

The number of carbon atoms in the linear perfluoroalkyl group is, in that the resulting surface layer will be more excellent in abrasion resistance, preferably from 1 to 20, more preferably from 1 to 10, further preferably from 1 to 6, particularly preferably from 1 to 3.

As specific examples of the perfluoroalkyl group, $CF_3$—, $CF_3CF_2$—, $CF_3CF_2CF_2$—, $CF_3CF_2CF_2CF_2$—, $CF_3CF_2CF_2CF_2CF_2$— and $CF_3CF_2CF_2CF_2CF_2CF_2$— may be mentioned, and in that the resulting surface layer will be more excellent in water/oil repellency, $CF_3$—, $CF_3CF_2$—, and $CF_3CF_2CF_2$— are preferred.

$X^1$ is a fluoroalkylene group having at least one fluorine atom.

The number of carbon atoms in the fluoroalkylene group is, in that the resulting surface layer will be more excellent in weather resistance and corrosion resistance, preferably from 1 to 8, more preferably from 1 to 6, particularly preferably from 2 to 4.

The fluoroalkylene group may be linear, branched or cyclic.

The number of fluorine atoms in the fluoroalkylene group is, in that the resulting surface layer will be more excellent in corrosion resistance, preferably from 1 to 2 times, more preferably from 1.7 to 2 times the number of carbon atoms.

The fluoroalkylene group may be a group having all hydrogen atoms in the fluoroalkylene group substituted with a fluorine atom (perfluoroalkylene group).

As specific examples of $(OX^1)$, —OCHF—, —$OCF_2CHF$—, —$OCHFCF_2$—, —$OCF_2CH_2$—, —$OCH_2CF_2$—, —$OCF_2CF_2CHF$—, —$OCHFCF_2CF_2$—, —$OCF_2CF_2CH_2$—, —$OCH_2CF_2CF_2$—, —$OCF_2CF_2CF_2CH_2$—, —$OCH_2CF_2CF_2CF_2$—, —$OCF_2CF_2CF_2CF_2CH_2$—, —$OCH_2CF_2CF_2CF_2CF_2$—, —$OCF_2CF_2CF_2CF_2CF_2CH_2$—, —$OCH_2CF_2CF_2CF_2CF_2CF_2$—, —$OCF_2$—, —$OCF_2CF_2$—, —$OCF_2CF_2CF_2$—, —$OCF(CF_3)CF_2$—, —$OCF_2CF_2CF_2CF_2$—, —$OCF(CF_3)CF_2CF_2$—, —$OCF_2CF_2CF_2CF_2CF_2$—, —$OCF_2CF_2CF_2CF_2CF_2CF_2$—, and —O-cyclo$C_4F_6$— may be mentioned.

-cyclo$C_4F_6$— means a perfluorocyclobutanediyl group, and as its specific example, a perfluorocyclobutan-1,2-diyl group may be mentioned.

The number m1 of repetition of $(OX^1)$ is an integer of at least 2, preferably an integer of from 2 to 200, further preferably an integer of from 5 to 150, particularly preferably an integer of from 5 to 100, most preferably an integer of from 10 to 50.

$(OX^1)_{m1}$ may consist of two or more types of $(OX^1)$. The two or more types of $(OX^1)$ may, for example, be two or more types of $(OX^1)$ differing in the number of carbon atoms, two or more types of $(OX^1)$ having the same number of carbon atoms but differing in whether they have a side chain or not or in the type of the side chain, or two or more types of $(OX^1)$ having the same number of carbon atoms but differing in the number of fluorine atoms.

The bonding order of the two or more types of $(OX^1)$ is not limited, and they may be arranged randomly, alternately or in blocks.

The poly(oxyfluoroalkylene) chain represented by $(OX^1)_{m1}$ is, in that the resulting film will be excellent in fingerprint stain removability, preferably a poly(oxyfluoroalkylene) chain composed mainly of units based on a oxyperfluoroalkylene group. In the poly(oxyfluoroalkylene) chain represented by $(OX^1)_{m1}$, the proportion of the number of units based on an oxyperfluoroalkylene group to the total number m1 of units is preferably from 50 to 100%, more preferably from 80 to 100%, particularly preferably from 90 to 100%.

The poly(oxyfluoroalkylene) chain is more preferably a poly(oxyperfluoroalkylene) chain or a poly(oxyfluoroalkylene) chain having one or two oxyfluoroalkylene units having a hydrogen atom, at one terminal or at both terminals. The poly(oxyfluoroalkylene) chain is particularly preferably a poly(oxyperfluoroalkylene) chain.

As $(OX^1)_{m1}$, $(OCH_{ma}F_{(2-ma)})_{m11}(OC_2H_{mb}F_{(4-mb)})_{m12}(OC_3H_{mc}F_{(6-mc)})_{m13}(OC_4H_{md}F_{(8-md)})_{m14}(OC_5H_{me}F_{(10-me)})_{m15}(OC_6H_{mf}F_{(12-mf)})_{m16}(O\text{-cyclo}C_4H_{mg}F_{(6-mg)})_{m17}$ is preferred. $\text{-cyclo}C_4H_{mg}F_{(6-mg)}$ means a fluorocyclobutane-diyl group, and is preferably a fluorocyclobutane-1,2-diyl group.

ma is 0 or 1, mb is an integer of from 0 to 3, mc is an integer of from 0 to 5, md is an integer of from 0 to 7, me is an integer of from 0 to 9, mf is an integer of from 0 to 11, and mg is an integer of from 0 to 5.

m1, m12, m13, m14, m15, m16 and m17 are each independently an integer of at least 0 and is preferably at most 100.

m11+m12+m13+m14+m15+m16+m17 is an integer of at least 2, preferably an integer of from 2 to 200, more preferably an integer of from 5 to 150, further preferably an integer of from 5 to 100, particularly preferably an integer of from 10 to 50.

Particularly, m12 is preferably an integer of at least 2, particularly preferably an integer of from 2 to 200.

Further, $C_3H_{mc}F_{(6-mc)}$, $C_4H_{md}F_{(8-md)}$, $C_5H_{me}F_{(10-me)}$ and $C_6H_{mf}F_{(12-mf)}$ may each be linear or branched, and are preferably linear in that the resulting surface layer will be more excellent in abrasion resistance.

The above formula represents the type and number of units, and does not represent arrangement of the units. That is, m11 to m16 represent the number of units, and for example, $(OCH_{ma}F_{(2-ma)})_{m11}$ does not necessarily represent a block of continuous m11 $(OCH_{ma}F_{(2-ma)})$ units. Likewise, the order of description of $(OCH_{ma}F_{(2-ma)})$ to $(O\text{-cyclo}C_4H_{mg}F_{(6-mg)})$ does not represent arrangement of them in the order of description.

In the above formula, in a case where two or more of m11 to m17 are not 0 (that is, $(OX^1)_{m1}$ consists of two or more types of units), the arrangement of different units may be random, alternate, in blocks, or a combination thereof.

Further, in a case where two or more of each type of the above units are contained, these units may be different. For example, in a case where m11 is 2 or more, the two or more $(OCH_{ma}F_{(2-ma)})$ may be the same or different.

$R^{f2}$ is a fluoroalkylene group having a group represented by $-CF_2-$.

The number of carbon atoms in the fluoroalkylene group is preferably from 1 to 6, particularly preferably from 1 to 3.

The fluoroalkylene group may be either linear or branched, and in that more excellent effects of the present invention will be obtained, preferably linear.

The fluoroalkylene group is, in that the resulting film will be more excellent in corrosion resistance, preferably a fluoroalkylene group having at least one $CF_2$ and having a number of fluorine atoms of from 1.5 to 2 times the number of carbon atoms, more preferably a $C_{1-6}$ perfluoroalkylene group, particularly preferably a $C_{1-3}$ perfluoroalkylene group.

As specific examples of $R^{f2}$, $-CF_2CHF-$, $-CHFCF_2-$, $-CF_2CH_2-$, $-CH_2CF_2-$, $-CF_2CF_2CHF-$, $-CHFCF_2CF_2-$, $-CF_2CF_2CH_2-$, $-CH_2CF_2CF_2-$, $-CF_2CF_2CF_2CH_2-$, $-CH_2CF_2CF_2CF_2-$, $-CF_2CF_2CF_2CF_2CH_2-$, $-CH_2CF_2CF_2CF_2CF_2-$, $-CF_2CF_2CF_2CF_2CF_2-$, $-CF_2-$, $-CF_2CF_2-$, $-CF_2CF_2CF_2-$, $-CF(CF_3)CF_2-$, $-CF_2CF_2CF_2CF_2-$, $-CF(CF_3)CF_2CF_2-$, $-CF_2CF_2CF_2CF_2CF_2-$, and $-CF_2CF_2CF_2CF_2CF_2CF_2-$ may be mentioned.

$Y^1$ is a (g1+1) valent linking group having no fluorine atom.

$Y^1$ may be any group so long as the effects of the present invention are not limited, and may, for example, be an alkylene group which may have an etheric oxygen atom or a bivalent organopolysiloxane residue, a carbon atom, a nitrogen atom, a silicon atom, a bivalent to octavalent organopolysiloxane residue, or a group having $Si(R^1)_{n1}L^1_{3-n1}$ removed from any of the formulae (1-1A), (1-1B) and (1-1A-1) to (1-1A-6) described hereinafter.

$R^1$ is a monovalent hydrocarbon group, preferably a monovalent saturated hydrocarbon group. The number of carbon atoms in $R^1$ is preferably from 1 to 6, more preferably from 1 to 3, particularly preferably from 1 to 2.

$L^1$ is a hydrolyzable group or a hydroxy group.

The hydrolyzable group is a group which becomes a hydroxy group by hydrolysis reaction. That is, a hydrolyzable silyl group represented by $Si-L^1$ becomes a silanol group represented by $Si-OH$ by hydrolysis reaction. The silanol groups further react with each other to form a $Si-O-Si$ bond. Further, the silanol group undergoes dehydration condensation reaction with a silanol group derived from an oxide contained in the substrate to form a $Si-O-Si$ bond.

The hydrolyzable group may, for example, be specifically an alkoxy group, an aryloxy group, a halogen atom, an acyl group, an acyloxy group or an isocyanate group ($-NCO$). The alkoxy group is preferably a $C_{1-4}$ alkoxy group. The aryloxy group is preferably a $C_{3-10}$ aryloxy group. The aryl group in the aryloxy group includes a heteroaryl group. The halogen atom is preferably a chlorine atom. The acyl group is preferably a $C_{1-6}$ acyl group. The acyloxy group is preferably a $C_{1-6}$ acyloxy group.

$L^1$ is, in view of more easy production of the fluorinated ether compound, preferably a $C_{1-4}$ alkoxy group or a chlorine atom. $L^1$ is, in that outgassing at the time of coating is small and the fluorinated ether compound will be more excellent in storage stability, preferably a $C_{1-4}$ alkoxy group, and in a case where the fluorinated ether compound is required to have long-term storage stability, particularly preferably an ethoxy group, and in a case where the reaction time after coating is to be short, particularly preferably a methoxy group.

n1 is an integer of from 0 to 2.

n1 is preferably 0 or 1, particularly preferably 0. By the presence of two or more $L^1$, adhesion of the surface layer to the substrate will be stronger.

When n1 is 0 or 1, the two or more $L^1$ present in one molecule may be the same or different. In view of availability of materials and production efficiency of the fluorinated ether compound, they are preferably the same. When n1 is 2, the two $R^1$ present in one molecule may the same or different. In view of availability of materials and production efficiency of the fluorinated ether compound, they are preferably the same.

g1 is an integer of at least 1, and in that the resulting surface layer will be more excellent in abrasion resistance, preferably an integer of from 2 to 4, more preferably 2 or 3, particularly preferably 3.

The group represented by $-Y^1-[Si(R^1)_{n1}L^1{}_{3\text{-}n1}]_{g1}$ in the formula (1) is preferably group (1-1A) or group (1-1B).

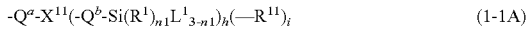  (1-1A)

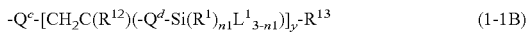  (1-1B)

In the formulae (1-1A) and (1-1B), $R^1$, $L^1$ and n1 are as defined above.

$Q^a$ is a single bond or a bivalent linking group.

The bivalent linking group may, for example, be a bivalent hydrocarbon group, a bivalent heterocyclic group, —O—, —S—, —SO$_2$—, —N(R$^d$)—, —C(O)—, —Si(R$^a$)$_2$— or a group having two or more of them combined. $R^a$ is an alkyl group (preferably $C_{1\text{-}10}$) or a phenyl group. $R^d$ is a hydrogen atom or an alkyl group (preferably $C_{1\text{-}10}$). The alkyl group as $R^d$ may have a hydrolyzable silyl group.

The bivalent hydrocarbon group may be a bivalent saturated hydrocarbon group, a bivalent aromatic hydrocarbon group, an alkenylene group or an alkynylene group. The bivalent saturated hydrocarbon group may be linear, branched or cyclic, and may, for example, be an alkylene group. The number of carbon atoms in the bivalent saturated hydrocarbon group is preferably from 1 to 20. Further, the bivalent aromatic hydrocarbon group preferably has from 5 to 20 carbon atoms and may, for example, be a phenylene group. The alkenylene group is preferably a $C_{2\text{-}20}$ alkenylene group, and the alkynylene group is preferably a $C_{2\text{-}20}$ alkynylene group.

The group having two or more of them combined may, for example, be —OC(O)—, —C(O)N(R$^d$)—, an alkylene group having —C(O)N(R$^d$)—, —CH$_2$N(R$^d$)C(O)—, an alkylene group having —CH$_2$N(R$^d$)C(O)—, an alkylene group having an etheric oxygen atom, an alkylene group having —OC(O)—, or alkylene group-Si(R$^a$)$_2$-phenylene group-Si(R$^a$)$_2$-.

$X^{11}$ is a singe bond, an alkylene group, a carbon atom, a nitrogen atom, a silicon atom or a bivalent to octavalent organopolysiloxane residue.

The alkylene group may have —O—, a silphenylene skeleton group, a bivalent organopolysiloxane residue or a dialkylsilylene group. The alkylene group may have a plurality of groups selected from the group consisting of —O—, a silphenylene skeleton group, a bivalent organopolysiloxane residue and a dialkylsilylene group.

The number of carbon atoms in the alkylene group represented by $X^{11}$ is preferably from 1 to 20, particularly preferably from 1 to 10.

The bivalent to octavalent organopolysiloxane residue may be a bivalent organopolysiloxane residue or the after described (w2+1) valent organopolysiloxane residue.

$Q^b$ is a singe bond or a bivalent linking group.

The bivalent linking group is as defined for the above $Q^a$.

$R^{11}$ is a hydroxy group or an alkyl group.

The number of carbon atoms in the alkyl group is preferably from 1 to 5, more preferably from 1 to 3, particularly preferably 1.

When $X^{11}$ is a singe bond or an alkylene group, h is 1, and i is 0, when $X^{11}$ is a nitrogen atom, h is an integer of from 1 to 2, i is an integer of from 0 to 1, and h+i=2 is satisfied, when $X^{11}$ is a carbon atom or a silicon atom, h is an integer of from 1 to 3, i is an integer of from 0 to 2, and h+i=3 is satisfied, and when $X^{11}$ is a bivalent to octavalent organopolysiloxane residue, h is an integer of from 1 to 7, i is an integer of from 0 to 6, and h+i=1 to 7 is satisfied.

When there are two or more (-$Q^b$-Si($R^1$)$_{n1}$$L^1{}_{3\text{-}n1}$), the two or more (-$Q^b$-Si($R^1$)$_{n1}$$L^1{}_{3\text{-}n1}$) may be the same or different. When there are two or more $R^{11}$, the two or more (—$R^{11}$) may be the same or different.

$Q^c$ is a singe bond, or an alkylene group which may have an etheric oxygen atom, and in view of easy production of the compound, preferably a single bond.

The number of carbon atoms in the alkylene group which may have an etheric oxygen atom is preferably from 1 to 10, particularly preferably from 2 to 6.

$R^{12}$ is a hydrogen atom or a $C_{1\text{-}10}$ alkyl group, and in view of easy production of the compound, preferably a hydrogen atom.

The alkyl group is preferably a methyl group.

$Q^d$ is a single bond or an alkylene group. The number of carbon atoms in the alkylene group is preferably from 1 to 10, particularly preferably from 1 to 6. In view of easy production of the compound, $Q^d$ is preferably a single bond or —CH$_2$—.

$R^{13}$ is a hydrogen atom or a halogen atom, and in view of easy production of the compound, preferably a hydrogen atom.

y is an integer of from 1 to 10, preferably an integer of from 1 to 6.

The two or more [CH$_2$C($R^{12}$) (-$Q^d$-Si($R^1$)$_{n1}$$L^1{}_{3\text{-}n1}$)] may be the same or different.

As the group (1-1A), groups (1-1A-1) to (1-1A-6) are preferred.

  (1-1A-1)

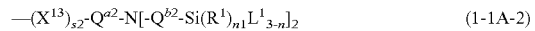  (1-1A-2)

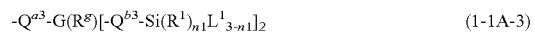  (1-1A-3)

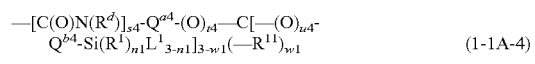  (1-1A-4)

  (1-1A-5)

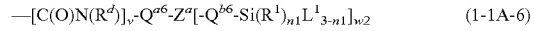  (1-1A-6)

In the formulae (1-1A-1) to (1-1A-6), $R^1$, $L^1$, and n1 are as defined above.

$X^{12}$ is —O— or —C(O)N($R^d$)— (provided that N in the formula is bonded to $Q^{b1}$).

$R^d$ is as defined above.

s1 is 0 or 1.

$Q^{b1}$ is an alkylene group. The alkylene group may have —O—, a silphenylene skeleton group, a bivalent organopolysiloxane residue or a dialkylsilylene group. The alkylene group may have a plurality of groups selected from the group consisting of —O—, a silphenylene skeleton group, a bivalent organopolysiloxane residue and a dialkylsilylene group.

When the alkylene group has —O—, a silphenylene skeleton group, a bivalent organopolysiloxane residue or a dialkylsilylene group, the alkylene group preferably has such a group between carbon atoms.

The number of carbon atoms in the alkylene group represented by $Q^{b1}$ is preferably from 1 to 10, particularly preferably from 2 to 6.

$Q^{b1}$ is, when s1 is 0, preferably —$CH_2OCH_2CH_2CH_2$—, —$CH_2OCH_2CH_2OCH_2CH_2CH_2$—, —$CH_2CH_2$—, —$CH_2CH_2CH_2$—, or —$CH_2OCH_2CH_2CH_2Si(CH_3)_2OSi(CH_3)_2CH_2CH_2$—. When $(X^{12})_{s1}$ is —O—, it is preferably —$CH_2CH_2CH_2$—, or —$CH_2CH_2OCH_2CH_2CH_2$—. When $(X^{12})_{s1}$ is —C(O)N(R^d)—, it is preferably a $C_{2-6}$ alkylene group (provided that N in the formula is bonded to $Q^{b1}$). When $Q^{b1}$ is such a group, the compound will readily be produced.

As specific examples of the group (3-1A-1), the following groups may be mentioned. In the following formulae, * represents the position of bonding to $R^{f2}$.

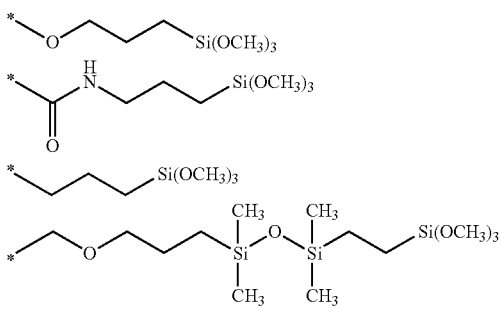

$X^{13}$ is —O—, —NH— or —C(O)N(R^d)—.

$R^d$ is as defined above.

$Q^{a2}$ is a single bond, an alkylene group, —C(O)— or a group having an etheric oxygen atom, —C(O)—, —C(O)O—, —OC(O)— or —NH— between carbon atoms of an alkylene group having at least 2 carbon atoms.

The number of carbon atoms in the alkylene group represented by $Q^{a2}$ is preferably from 1 to 10, particularly preferably from 1 to 6.

The number of carbon atoms in the group having an etheric oxygen atom, —C(O)—, —C(O)O—, —OC(O)— or —NH— between carbon atoms of an alkylene group having at least 2 carbon atoms, represented by $Q^{a2}$, is preferably from 2 to 10, particularly preferably from 2 to 6.

$Q^{a2}$ is, in that the compound will readily be produced, preferably —$CH_2$—, —$CH_2CH_2$—, —$CH_2CH_2CH_2$—, —$CH_2OCH_2CH_2$—, —$CH_2NHCH_2CH_2$—, —$CH_2CH_2OC(O)CH_2CH_2$—, or —C(O)— (provided that the right side is bonded to N).

s2 is 0 or 1 (provided that when $Q^{a2}$ is a singe bond, it is 0). It is preferably 0 in that the compound will readily be produced.

$Q^{b2}$ is an alkylene group or a group having a bivalent organopolysiloxane residue, an etheric oxygen atom or —NH— between carbon atoms of an alkylene group having at least 2 carbon atoms.

The number of carbon atoms in the alkylene group represented by $Q^{b2}$ is preferably from 1 to 10, particularly preferably from 2 to 6.

The number of carbon atoms in the group having a bivalent organopolysiloxane residue, an etheric oxygen atom or —NH— between carbon atoms of an alkylene group having at least 2 carbon atoms, represented by $Q^{b2}$, is preferably from 2 to 10, particularly preferably from 2 to 6.

$Q^{b2}$ is, in that the compound will readily be produced, preferably —$CH_2CH_2CH_2$—, or —$CH_2CH_2OCH_2CH_2CH_2$— (provided that the right side id bonded to Si).

The two $[-Q^{b2}-Si(R^1)_{n1}L^1_{3-n}]$ may be the same or different.

As specific examples of the group (3-1A-2), the following groups may be mentioned. In the following formulae, * represents the position of bonding to $R^{f2}$.

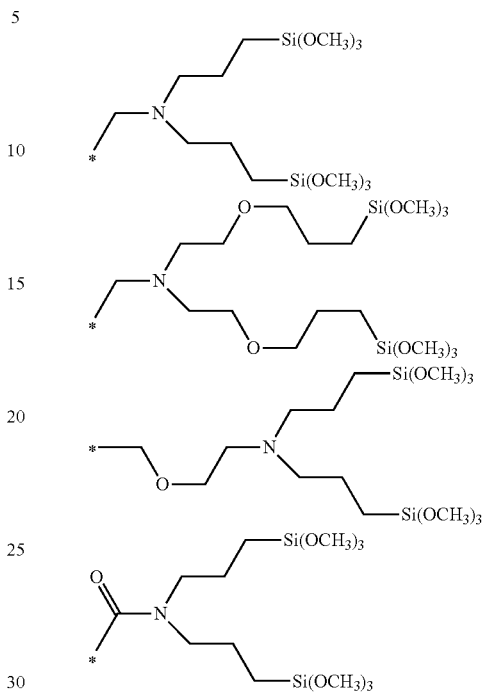

$Q^{a3}$ is a single bond or an alkylene group which may have an etheric oxygen atom, and in that the compound will readily be produced, preferably a single bond.

The number of carbon atoms in the alkylene group which may have an etheric oxygen atom is preferably from 1 to 10, particularly preferably from 2 to 6.

G is a carbon atom or a silicon atom.

$R^g$ is a hydroxy group or an alkyl group. The number of carbon atoms in the alkyl group represented by $R^g$ is preferably from 1 to 4.

$G(R^g)$ is, in that the compound will readily be produced, preferably C(OH) or Si($R^{ga}$) (provided that $R^{ga}$ is an alkyl group, preferably having from 1 to 10 carbon atoms, and is particularly preferably a methyl group).

$Q^{b3}$ is an alkylene group or a group having an etheric oxygen atom or a bivalent organopolysiloxane residue between carbon atoms of an alkylene group having at least 2 carbon atoms. The number of carbon atoms in the alkylene group represented by $Q^{b3}$ is preferably from 1 to 10, particularly preferably from 2 to 6.

The number of carbon atoms in the group having an etheric oxygen atom or a bivalent organopolysiloxane residue between carbon atoms of an alkylene group having at least 2 carbon atoms, represented by $Q^{b3}$, is preferably from 2 to 10, particularly preferably from 2 to 6.

$Q^{b3}$ is, in that the compound will readily be produced, preferably —$CH_2CH_2$—, —$CH_2CH_2CH_2$—, or —$CH_2CH_2CH_2CH_2CH_2CH_2CH_2CH_2$—.

The two $[-Q^{b3}-Si(R^1)_{n1}L^1_{3-n1}]$ may be the same or different.

As specific examples of the group (3-1A-3), the following groups may be mentioned. In the following formulae, * represents the position of bonding to $R^{f2}$.

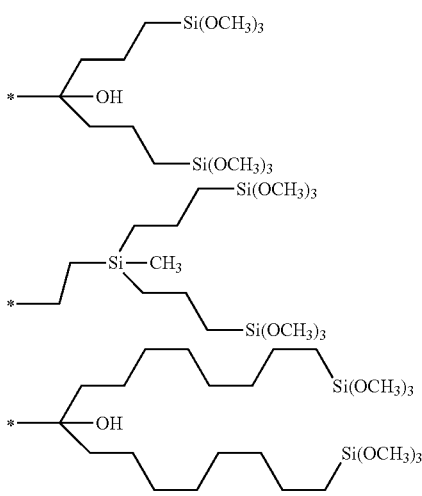

$R^d$ and $R^{11}$ in the formula (1-1A-4) are as defined above.

s4 is 0 or 1.

$Q^{a4}$ is a single bond or an alkylene group which may have an etheric oxygen atom.

The number of carbon atoms in the alkylene group which may have an etheric oxygen atom is preferably from 1 to 10, particularly preferably from 2 to 6.

t4 is 0 or 1 (provided that when $Q^{a4}$ is a singe bond, it is 0).

$-Q^{a4}$-$(O)_{t4}$— is, in that the compound will readily be produced, when s4 is 0, preferably a single bond, —CH$_2$O—, —CH$_2$OCH$_2$—, —CH$_2$OCH$_2$CH$_2$O—, —CH$_2$OCH$_2$CH$_2$OCH$_2$—, or —CH$_2$OCH$_2$CH$_2$CH$_2$CH$_2$OCH$_2$— (provided that the left side is bonded to $(R^fO)_m$), and when s4 is 1, it is preferably a single bond, —CH$_2$—, or —CH$_2$CH$_2$—.

$Q^{b4}$ is an alkylene group, and the alkylene group may have —O—, —C(O)N(R$^d$)— (R$^d$ is as defined above), a silphenylene skeleton group, a bivalent organopolysiloxane residue or a dialkylsilylene group.

In a case where the alkylene group has —O— or a silphenylene skeleton group, the alkylene group preferably has —O— or the silphenylene skeleton group between carbon atoms. Further, in a case where the alkylene group has —C(O)N(R$^d$)—, a dialkylsilylene group or a bivalent organopolysiloxane residue, the alkylene group preferably has such a group between carbon atoms or at the terminal on the side bonded to $(O)_{u4}$.

The number of carbon atoms in the alkylene group represented by $Q^{b4}$ is preferably from 1 to 10, particularly preferably from 2 to 6.

u4 is 0 or 1.

—$(O)_{u4}$-$Q^{b4}$- is, in that the compound will readily be produced, preferably —CH$_2$CH$_2$—, —CH$_2$CH$_2$CH$_2$—, —CH$_2$OCH$_2$CH$_2$CH$_2$—, —CH$_2$OCH$_2$CH$_2$CH$_2$CH$_2$CH$_2$—, —OCH$_2$CH$_2$CH$_2$—, —OSi(CH$_3$)$_2$CH$_2$CH$_2$CH$_2$—, —OSi(CH$_3$)$_2$OSi(CH$_3$)$_2$CH$_2$CH$_2$CH$_2$—, or —CH$_2$CH$_2$CH$_2$Si(CH$_3$)$_2$PhSi(CH$_3$)$_2$CH$_2$CH$_2$— (provided that the right side is bonded to Si).

w1 is an integer of from 0 to 2, preferably 0 or 1, particularly preferably 0.

When there are two or more [—$(O)_{u4}$-$Q^{b4}$-Si(R$^1$)$_{n1}$L$^1_{3-n1}$], the two or more [—$(O)_{u4}$-$Q^{b4}$-Si(R$^1$)$_{n1}$L$^1_{3-n1}$] may be the same or different.

When there are two or more $R^{11}$, the two or more (—$R^{11}$) may be the same or different.

As specific examples of the group (1-1A-4), the following groups may be mentioned. In the following formulae, * represents the position of bonding to $R^{f2}$.

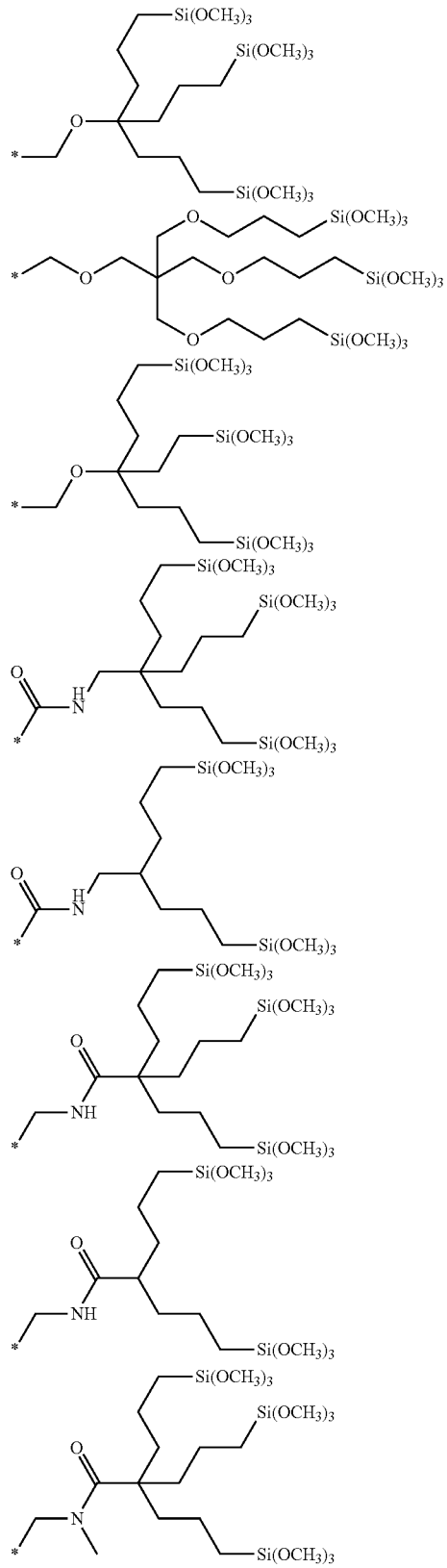

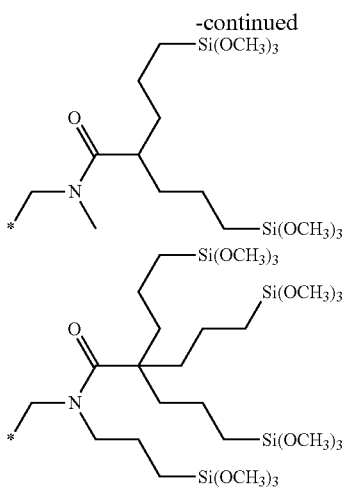

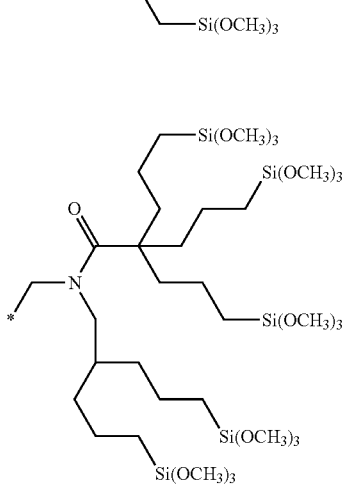

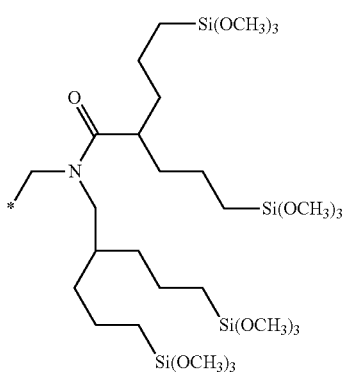

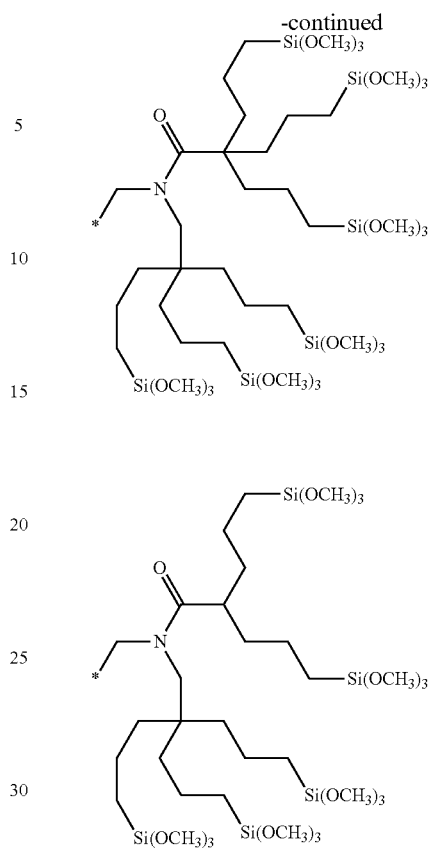

$Q^{a5}$ is an alkylene group which may have an etheric oxygen atom.

The number of carbon atoms in the alkylene group which may have an etheric oxygen atom is preferably from 1 to 10, particularly preferably from 2 to 6.

$Q^{a5}$ is, in that the compound will readily be produced, preferably —CH$_2$OCH$_2$CH$_2$CH$_2$—, —CH$_2$OCH$_2$CH$_2$OCH$_2$CH$_2$CH$_2$—, —CH$_2$CH$_2$—, or —CH$_2$CH$_2$CH$_2$-(provided that the right side is bonded to Si).

$Q^{b5}$ is an alkylene group or a group having an etheric oxygen atom or a bivalent organopolysiloxane residue between carbon atoms of an alkylene group having at least 2 carbon atoms. The number of carbon atoms in the alkylene group represented by $Q^{b5}$ is preferably from 1 to 10, particularly preferably from 2 to 6.

The number of carbon atoms in the group having an etheric oxygen atom or a bivalent organopolysiloxane residue between carbon atoms of an alkylene group having at least 2 carbon atoms, represented by $Q^{b5}$, is preferably from 2 to 10, particularly preferably from 2 to 6.

$Q^{b5}$ is, in that the compound will readily be produced, preferably —CH$_2$CH$_2$CH$_2$—, or —CH$_2$CH$_2$OCH$_2$CH$_2$CH$_2$— (provided that the right side is bonded to Si(R$^1$)$_{n1}$L$^1{}_{3-n1}$).

The three [-Q$^{b5}$-Si(R$^1$)$_{n1}$L$^1{}_{3-n1}$] may be the same or different.

As specific examples of the group (1-1A-5), the following group may be mentioned. In the following formula, * represents the position of bonding to R$^{f2}$.

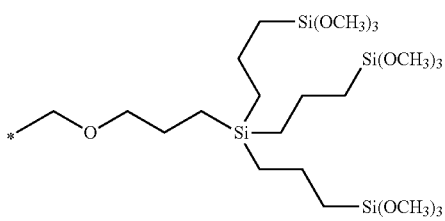

$R^d$ in the formula (1-1A-6) is as defined above.

v is 0 or 1.

$Q^{a6}$ is an alkylene group which may have an etheric oxygen atom.

The number of carbon atoms in the alkylene group which may have an etheric oxygen atom is preferably from 1 to 10, particularly preferably from 2 to 6.

$Q^{a6}$ is, in that the compound will readily be produced, preferably —CH$_2$OCH$_2$CH$_2$CH$_2$—, —CH$_2$OCH$_2$CH$_2$OCH$_2$CH$_2$CH$_2$—, —CH$_2$CH$_2$—, or —CH$_2$CH$_2$CH$_2$-(provided that the right side is bonded to $Z^a$).

$Z^a$ is a (w2+1) valent organopolysiloxane residue.

w2 is an integer of from 2 to 7.

As the (w2+1) valent organopolysiloxane residue, the following groups may be mentioned. $R^a$ in the following formulae is as defined above.

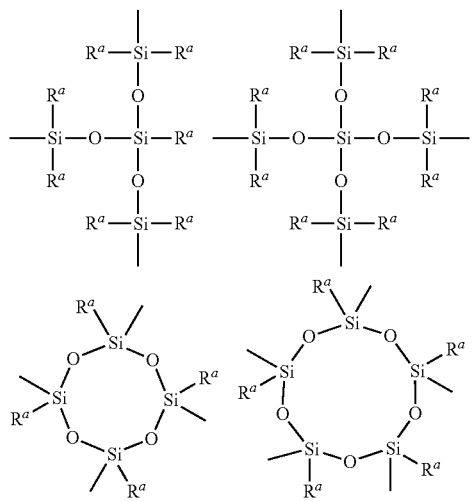

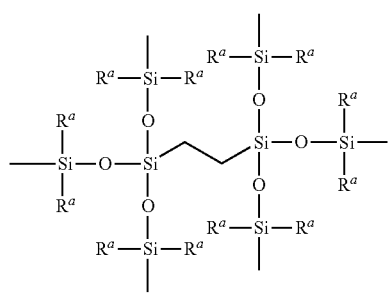

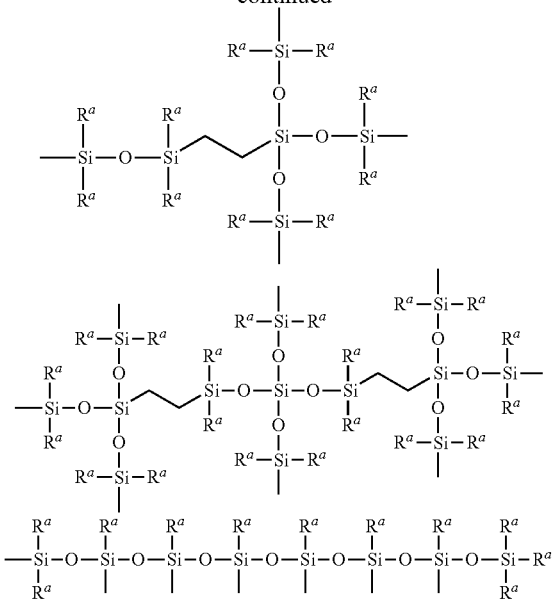

$Q^{b6}$ is an alkylene group or a group having an etheric oxygen atom or a bivalent organopolysiloxane residue between carbon atoms of an alkylene group having at least 2 carbon atoms.

The number of carbon atoms in the alkylene group represented by $Q^{b6}$ is preferably from 1 to 10, particularly preferably from 2 to 6.

The number of carbon atoms in the group having an etheric oxygen atom or a bivalent organopolysiloxane residue between carbon atoms of an alkylene group having at least 2 carbon atoms, represented by $Q^{b6}$, is preferably from 2 to 10, particularly preferably from 2 to 6.

$Q^{b6}$ is, in that the compound will readily be produced, preferably —CH$_2$CH$_2$—, or —CH$_2$CH$_2$CH$_2$—.

w2 [-Q$^{b6}$-Si(R$^1$)$_{n1}$L$^1_{3-n1}$] may be the same or different.

<Compound Represented by Formula (2)>

The compound (2) is a fluorinated ether compound represented by the formula (2).

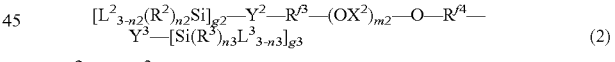

$[L^2_{3-n2}(R^2)_{n2}Si]_{g2}$—Y$^2$—R$^{f3}$—(OX$^2$)$_{m2}$—O—R$^{f4}$—Y$^3$—[Si(R$^3$)$_{n3}$L$^3_{3-n3}$]$_{g3}$ (2)

$L^2$ and $L^3$ are each independently a hydrolyzable group or a hydroxy group. The definitions and the preferred embodiments of $L^2$ and $L^3$ are the same as those of $L^1$ in the formula (1).

$R^2$ and $R^3$ are each independently a monovalent hydrocarbon group. The definitions and the preferred embodiments of $R^2$ and $R^3$ are the same as those of $R^1$ in the formula (1).

$Y^2$ is a (g2+1) valent linking group having no fluorine atom. g2 is an integer of at least 1. The definitions and the preferred embodiments of $Y^2$ and g2 are respectively the same as those of $Y^1$ and g1 in the formula (1).

$R^{f3}$ and $R^{f4}$ are each independently a fluoroalkylene group having a group represented by —CF$_2$—. The definitions and the preferred embodiments of $R^{f3}$ and $R^{f4}$ are the same as those of $R^{f2}$ in the formula (1).

$X^2$ is a fluoroalkylene group having at least one fluorine atom. m2 is an integer of at least 2. The definitions and the preferred embodiments of $X^2$, m2, (OX$^2$) and (OX$^2$)$_{m2}$ are respectively the same as those of $X^1$, m1, (OX$^1$) and (OX$^1$)$_{m1}$ in the formula (1).

$Y^3$ is a (g3+1) valent linking group having no fluorine atom. g3 is an integer of at least 1. The definitions and the preferred embodiments of $Y^3$ and g3 are respectively the same as those of $Y^1$ and g1 in the formula (1). $Y^2$ and $Y^3$ are independently a group similar to $Y^1$ in the formula (1), they may not be the same, and g2 and g3 are also independently an integer similar to g1 in the formula (1), and they may not be the same.

n2 and n3 are each independently an integer of from 0 to 2. The definitions and the preferred embodiments of n2 and n3 are the same as those of n1 in the formula (1).

As a preferred embodiment of the compound (2), $[L^2_{3-n2}(R^2)_{n2}Si]_{g2}$—$Y^2$—$R^{f3}$— and —$R^{f4}$—$Y^3$—$[Si(R^3)_{n3}L^3_{3-n3}]_{g3}$ are the same group, whereby a surface layer more excellent in abrasion resistance and sliding resistance will be formed.

Further, as a preferred embodiment of the composition (1), the compound (1) and the compound (2) are used in such a combination that —$R^{f2}$—$Y^1$—$[Si(R^1)_{n1}L^1_{3-n1}]_{g1}$ in the compound (1) of the formula (1), and $[L^2_{3-n2}(R^2)_{n2}Si]_{g2}$—$Y^2$—$R^{f3}$— and —$R^{f4}$—$Y^3$—$[Si(R^3)_{n3}L^3_{3-n3}]_{g3}$ in the compound (2) of the formula (2) are the same group, whereby a surface layer more excellent in abrasion resistance and sliding resistance will be formed.

As specific examples of the compound (1) and the compound (2), for example, compounds as described in the following documents may be mentioned.

Perfluoropolyether-modified aminosilanes described in JP-A-H11-029585 and JP-A-2000-327772,
  silicon-containing organic fluorinated polymers described in Japanese Patent No. 2874715,
  organic silicon compounds described in JP-A-2000-144097,
  fluorinated siloxanes described in JP-A-2002-506887,
  organic silicone compounds described in JP-A-2008-534696,
  fluorinated modified hydrogenated polymers described in Japanese Patent No. 4138936,
  compounds described in U.S. Patent Application No. 2010/0129672, WO2014/126064 and JP-A-2014-070163,
  organosilicon compounds described in WO2011/060047 and WO2011/059430,
  fluorinated organosilane compounds described in WO2012/064649,
  fluoroxyalkylene group-containing polymers described in JP-A-2012-72272, fluorinated ether compounds described in WO2013/042732, WO2013/121984, WO2013/121985, WO2013/121986, WO2014/163004, JP-A-2014-080473, WO2015/087902, WO2017/038830, WO2017/038832, WO2017/187775, WO2018/216630, WO2019/039186, WO2019/039226, WO2019/039341, WO2019/044479, WO2019/049753, WO2019/163282 and JP-A-2019-044158,
  perfluoro(poly)ether-containing silane compounds described in JP-A-2014-218639, WO2017/022437, WO2018/079743 and WO2018/143433,
  perfluoro(poly)ether group-containing silane compounds described in WO2018/169002,
  fluoro(poly)ether group-containing silane compounds described in WO2019/151442,
  (poly)ether group-containing silane compounds described in WO2019/151445,
  perfluoropolyether group-containing compounds described in WO2019/098230,
  fluoropolyether group-containing polymer-modified silanes described in JP-A-2015-199906, JP-A-2016-204656, JP-A-2016-210854 and JP-A-2016-222859, and
  fluorinated compounds described in WO2019/039083 and WO2019/049754.

As commercial products of the compound (1) and the compound (2), KY-100 series (KY-178, KY-185, KY-195, etc.), manufactured by Shin-Etsu Chemical Co., Ltd., Afluid (registered trademark) S550 manufactured by AGC Inc., OPTOOL (registered trademark) DSX, OPTOOL (registered trademark) AES, OPTOOL (registered trademark) UF503, OPTOOL (registered trademark) UD509, etc., manufactured by DAIKIN INDUSTRIES, LTD. may, for example, be mentioned.

<Ratio 1>

The ratio 1 means the ratio $[M1_{CF3}/(M1_{CF2}+M2_{CF2}+M3_{CF2})]$ of the number of moles of the group represented by —$CF_3$ in $R^{f1}$ in the formula (1) to the total of the number of moles of the group represented by —$CF_2$— closest to $Y^1$ in $R^{f2}$ in the formula (1) (hereinafter sometimes referred to as "$M1_{CF2}$"), the number of moles of the group represented by —$CF_2$— closest to $Y^2$ in $R^{f3}$ in the formula (2) (hereinafter sometimes referred to as "$M2_{CF2}$"), and the number of moles of the group represented by —$CF_2$— closest to $Y^3$ in $R^{f4}$ in the formula (2) (hereinafter sometimes referred to as "$M3_{CF2}$"), and its value is from 0.001 to 0.1. Usually, $M2_{CF2}$ and $M3_{CF2}$ are the same.

The lower limit value of the ratio 1 is, in that a surface layer more excellent in water/oil repellency will be obtained while maintaining excellent abrasion resistance and sliding resistance, preferably 0.003, particularly preferably 0.005.

The upper limit value of the ratio 1 is, in that a surface layer more excellent in abrasion resistance and sliding resistance will be obtained while maintaining excellent water/oil repellency, preferably 0.08, particularly preferably 0.07.

The composition (1) may contain two or more types of compounds (1) and two or more types of compounds (2).

When the composition (1) contains two or more types of compounds (1), $M1_{CF2}$ means the total of $M1_{CF2}$ in the two or more types of compounds (1), and $M1_{CF3}$ means the total of $M1_{CF3}$ in the two or more types of compounds (1).

When the composition (1) contains two or more types of compounds (2), $M2_{CF2}$ means the total of $M2_{CF2}$ in the two or more types of compounds (2), and $M3_{CF2}$ means the total of $M3_{CF2}$ in the two or more types of compounds (2).

$M1_{CF3}$ and $M1_{CF2}+M2_{CF2}+M3_{CF2}$ are obtained by $^{19}$F-NMR using the composition (1) containing the compound (1) and the compound (2). The ratio 1 $[M1_{CF3}/(M1_{CF2}+M2_{CF2}+M3_{CF2})]$ is calculated based on the values thus measured.

As a specific examples, the ratio is calculated from the integrated values of the following $^{19}$F-NMR peaks.

In the following, representative peak positions of groups represented by [ ] are shown. D is an alkylene group or an alkylene group having a carbonyl group (which may be an ester group or an amide group) on the $CF_2$ side. $R^f$ is a perfluoroalkylene group.

[$CF_3$]—O—$CF_2$—: −50 to −60 ppm
[$CF_3$]—($CF_2$)$_n$—O—$CF_2$—: −70 to −90 ppm
$R^f$—O—[$CF_2$]-D-: −70 to −90 ppm
$R^f$—O—($CF_2$)$_n$—[$CF_2$]-D-: −110 to −135 ppm The total content of the compound (1) and the compound (2) is, to the total mass of the composition (1), preferably from 80 to 100 mass %, more preferably from 90 to 100 mass %.

<Other Component>

The composition (1) may contain a liquid medium. As specific examples of the liquid medium, water and an organic solvent may be mentioned.

The liquid medium preferably contains an organic solvent, and in view of excellent coating property, more preferably contains an organic solvent having a boiling point of from 35 to 250° C. The boiling point means a normal boiling point. As specific examples of the organic solvent, a fluorinated organic solvent and a non-fluorinated organic solvent may be mentioned, and in view of excellent solubility, a fluorinated organic solvent is preferred. The organic solvent may be used alone or in combination of two or more.

As specific examples of the fluorinated organic solvent, a fluorinated alkane, a fluorinated aromatic compound, a fluoroalkyl ether, a fluorinated alkylamine and a fluoroalcohol may be mentioned.

The fluorinated alkane is preferably a compound having 4 to 8 carbon atoms, and may, for example, be $C_6F_{13}H$ (AC-2000, trade name, manufactured by AGC Inc.), $C_6F_{13}C_2H_5$ (AC-6000, trade name, manufactured by AGC Inc.), or $C_2F_5CHFCHFCF_3$ (Vertrel, trade name, manufactured by DuPont).

As specific examples of the fluorinated aromatic compound, hexafluorobenzene, trifluoromethylbenzene, perfluorotoluene, 1,3-bis(trifluoromethyl)benzene, and 1,4-bis(trifluoromethyl)benzene may be mentioned.

The fluoroalkylether is preferably a compound having from 4 to 12 carbon atoms, and may, for example, be $CF_3CH_2OCF_2CF_2H$ (AE-3000, trade name, manufactured by AGC Inc.), $C_4F_9OCH_3$ (Novec-7100, trade name, manufactured by 3M), $C_4F_9OC_2H_5$ (Novec-7200, trade name, manufactured by 3M), and $C_2F_5CF(OCH_3)C_3F_7$ (Novec-7300, trade name, manufactured by 3M).

As specific examples of the fluorinated alkylamine, perfluorotripropylamine and perfluorotributylamine may be mentioned.

As specific examples of the fluoroalcohol, 2,2,3,3-tetrafluoropropanol, 2,2,2-trifluoroethanol and hexafluoroisopropanol may be mentioned.

The non-fluorinated organic solvent is preferably a compound consisting solely of hydrogen atoms and carbon atoms, or a compound consisting solely of hydrogen atoms, carbon atoms and oxygen atoms, and may be specifically a hydrocarbon organic solvent, a ketone organic solvent, an ether organic solvent, an ester organic solvent or an alcohol organic solvent.

As specific examples of the hydrocarbon organic solvent, hexane, heptane and cyclohexane may be mentioned.

As specific examples of the ketone organic solvent, acetone, methyl ethyl ketone and methyl isobutyl ketone may be mentioned.

As specific examples of the ether organic solvent, diethyl ether, tetrahydrofuran and tetraethylene glycol dimethyl ether may be mentioned.

As specific examples of the ester organic solvent, ethyl acetate and butyl acetate may be mentioned.

As specific examples of the alcohol organic solvent, isopropyl alcohol, ethanol and n-butanol may be mentioned.

In a case where the composition (1) contains the liquid medium, the content of the liquid medium is, to the total mass of the composition (1), preferably from 70 to 99.99 mass %, particularly preferably from 80 to 99.9 mass %.

The composition (1) may contain components other than the above components, within a range not to impair the effects of the present invention.

As such other components, compounds inevitable in production such as by-products formed in the process for producing the compound (1) and the compound (2) and unreacted materials may be mentioned.

Further, additives such as an acid catalyst and a basic catalyst to promote hydrolysis and condensation reaction of the hydrolyzable silyl group may be mentioned.

As specific examples of the acid catalyst, hydrochloric acid, nitric acid, acetic acid, sulfuric acid, phosphoric acid, sulfonic acid, methanesulfonic acid and p-toluenesulfonic acid may be mentioned. As specific examples of the basic catalyst, sodium hydroxide, potassium hydroxide and ammonia may be mentioned.

The content of such other components is, to the total amount of the compound (1) and the compound (2), preferably from 0 to 10 mass %, more preferably from 0 to 5 mass %, particularly preferably from 0 to 1 mass %.

Second Embodiment

The composition according to a second embodiment of the present invention (hereinafter sometimes referred to as "composition (2)") contains the above compound (1), the above compound (2) and the compound (3), wherein the ratio (hereinafter sometimes referred to as "ratio 2") of the total of the number of moles of the group represented by —$CF_3$ in $R^{f1}$ in the formula (1), the number of moles of the group represented by —$CF_3$ in $R^{f5}$ in the formula (3) and the number of moles of the group represented by —$CF_3$ in $R^{f6}$ in the formula (3) to the total of the number of moles of the group represented by —$CF_2$— closest to $Y^1$ in $R^{f2}$ in the formula (1), the number of moles of the group represented by —$CF_2$— closest to $Y^2$ in $R^{f3}$ in the formula (2) and the number of moles of the group represented by —$CF_2$— closest to $Y^3$ in $R^{f4}$ in the formula (2), is from 0.001 to 0.1.

The number of moles of the group represented by —$CF_3$ means the total of the number of moles of the group located at one terminal of the compound (1) and the number of moles of the group located at both terminals of the compound (3). Further, the total number of moles of the group represented by —$CF_2$— means the total of the number of moles of the group located in the vicinity of one terminal of the compound (1) and the number of moles of the group located in the vicinity of both terminals of the compound (2). That is, a lower value of the ratio 2 means a higher content of the compound (2) in the composition, and a higher value of the ratio 2 means a higher content of the compound (1) or the compound (3) in the composition.

Accordingly, from the same reasons as those of the composition (1), it is considered that a surface layer excellent in abrasion resistance and sliding resistance can be formed by using the composition (2) which satisfies the ratio 2.

The composition (2) is different from the composition (1) in that it contains the compound (3) as an essential component and the ratio including the compound (3) is specified.

In the following, points different form those of the composition (1) described in the second embodiment will be described.

<Compound Represented by Formula (1) and Compound Represented by Formula (2)>

The compound (1) and the compound (2) contained in the composition (2) are respectively the same as the compound (1) and the compound (2) contained in the composition (1).

<Compound Represented by Formula (3)>

The compound (3) is a fluorinated ether compound represented by the formula (3).

$$R^{f5}—(OX^3)_{m3}—O—R^{f6} \quad (3)$$

$R^{f5}$ and $R^{f6}$ are each independently a linear perfluoroalkyl group. The definitions and the preferred embodiments of $R^{f5}$ and $R^{f6}$ are the same as those of $R^{f1}$ in the formula (1). Particularly in that the resulting surface layer will be more excellent in water/oil repellency, $R^{f5}$ and $R^{f6}$ are preferably each independently $CF_3—$, $CF_3CF_2—$, or $CF_3CF_2CF_2—$.

$X^3$ is a fluoroalkylene group having at least one fluorine atom. m3 is an integer of at least 2. The definitions and the preferred embodiments of $X^3$, m3, $(OX^3)$ and $(OX^3)_{m3}$ are respectively the same as those of $X^1$, m1, $(OX^1)$ and $(OX^1)_{m1}$ in the formula (1).

As a commercial product of the compound (3), Fomblin M03 manufactured by Solvay Solexis may be mentioned.

<Ratio 2>

The ratio 2 is the ratio of the total of $M1_{CF3}$, the number of moles of the group represented by $—CF_3$ in $R^{f5}$ in the formula (3) (hereinafter sometimes referred to as "$M2_{CF3}$") and the number of moles of the group represented by $—CF_3$ in $R^{f6}$ in the formula (3) (hereinafter sometime referred to as "$M3_{CF3}$") to the total of $M1_{CF2}$, $M2_{CF2}$ and $M3_{CF2}$, that is $[(M1_{CF3}+M2_{CF3}+M3_{CF3})/(M1_{CF2}+M2_{CF2}+M3_{CF2})]$, and its value is from 0.001 to 0.1.

The lower limit value of the ratio 2 is, in that a surface layer more excellent in water/oil repellency will be obtained while maintaining excellent abrasion resistance and sliding resistance, preferably 0.003, particularly preferably 0.005.

The upper limit value of the ratio 2 is, in that a surface layer more excellent in abrasion resistance and sliding resistance will be obtained while maintaining excellent water/oil repellency, preferably 0.08, particularly preferably 0.07.

The composition (2) may contain two or more types of each of compound (1) to compound (3).

The definitions of $M1_{CF}$ and $M1_{CF3}$ when the composition (2) contains two or more types of compounds (1) are the same as those when the composition (1) contains two or more types of compounds (1).

The definitions of $M2_{CF2}$ and $M3_{CF2}$ when the composition (2) contains two or more types of compounds (2) are the same as those when the composition (1) contains two or more types of compounds (2).

When the composition (3) contains two or more types of compounds (3), $M2_{CF3}$ means the total of $M2_{CF3}$ in the two or more types of compounds (3), and $M3_{CF3}$ means the total of $M3_{CF3}$ in the two or more types of compounds (3).

$M1_{CF3}+M2_{CF3}+M3_{CF3}$ and $M1_{CF2}+M2_{CF2}+M3_{CF2}$ are obtained by $^{19}$F-NMR using the composition (2) containing the compounds (1) to (3). The ratio 2 $[(M1_{CF3}+M2_{CF3}+M3_{CF3})/(M1_{CF2}+M2_{CF2}+M3_{CF2})]$ is calculated based on the values thus measured.

The total content of the compounds (1) to (3) is, to the total mass of the composition (2), preferably from 50 to 100 mass %, more preferably from 80 to 100 mass %.

<Other Component>

The composition (2) may contain a liquid medium. The specific examples and the preferred embodiments of the liquid medium in the composition (2) are the same as those of the liquid medium in the composition (1).

When the composition (2) contains the liquid medium, the content of the liquid medium is, to the total mass of the composition (2), preferably from 70 to 99.99 mass %, particularly preferably from 80 to 99.9 mass %.

The composition (2) may contain components other than the above components, within a range not to impair the effects of the present invention. The specific examples and the preferred embodiments of other components in the composition (2) are the same as those of other components in the composition (1).

The content of other components is, to the total amount of the compounds (1) to (3), preferably from 0 to 10 mass %, more preferably from 0 to 5 mass %, particularly preferably from 0 to 1 mass %.

[Article]

The article of the present invention comprises a substrate and a surface layer formed of the composition (1) or the composition (2) on the substrate.

The surface layer contains compounds formed by hydrolysis and condensation reaction of the compound (1) and the compound (2).

The thickness of the surface layer is preferably from 1 to 100 nm, particularly preferably from 1 to 50 nm. When the thickness of the surface layer is at least the lower limit value, sufficient effects by the surface layer will be obtained. When the thickness of the surface layer is at most the upper limit value, high utilization efficiency will be obtained.

The thickness of the surface layer is calculated from the oscillation period of an interference pattern of reflected X-rays obtained by X-ray reflectometry (XRR) using an X-ray diffractometer for thin film analysis.

The substrate is not particularly limited so long as it is a substrate to be used as touched with other article (such as a stylus) or human fingers, a substrate to be held by human hands when operated, and/or a substrate to be placed on other article (for example, a table), and which is desired to have water/oil repellency imparted. As specific examples of the material of the substrate, a metal, a resin, glass, sapphire, ceramic, stone and a composite material thereof may be mentioned. The glass may be chemically tempered.

As the substrate, a substrate for a touch panel and a substrate for display are preferred, and a substrate for a touch panel is particularly preferred. The substrate for a touch panel preferably has translucency. "Having translucency" means that the normal incidence visible light transmittance in accordance with JIS R3106: 1998 (ISO9050: 1990) is at least 25%. As a material of the substrate for a touch panel, glass or a transparent resin is preferred.

Further, as the substrate, a glass or resin film to be used for an exterior portion (excluding the display portion) of a device such as a mobile phone (for example, a smartphone), a personal digital assistant, a gaming machine or a remote controller, are also preferred.

The surface layer may be formed directly on the surface of the substrate or may be formed on the substrate via other film formed on the surfaced of the substrate. As specific examples of other film, an undercoat film formed on the surface of the substrate by subjecting the substrate to an undercoat treatment with e.g. compounds described in WO2011/016458, paragraphs [0089] to [0095] or $SiO_2$.

The article may be produced, for example, by the following method.

A method of treating the surface of the substrate with the composition (1) or the composition (2) by dry coating method to obtain the article.

A method of applying the composition (1) containing a liquid medium or the composition (2) containing a liquid medium to the surface of the substrate by wet coating method, followed by drying to obtain the article.

In the wet coating method, it is also possible to use a composition containing compounds obtained by preliminarily hydrolyzing the compound (1) and the compound (2) with e.g. an acid catalyst or a basic catalyst, and a liquid medium.

As specific examples of the dry coating method, vacuum deposition method, CVD method and sputtering method may be mentioned. Among them, with a view to suppressing decomposition of the compounds (1) to (3) and in view of simplicity of the apparatus, vacuum deposition method is suitable. At the time of vacuum deposition, a pellet-form substance having a metal porous body of e.g. iron or steel impregnated with the composition (1) or (2) may be used.

As specific examples of the wet coating method, spin coating method, wipe coating method, spray coating method, squeeze coating method, dip coating method, die coating method, ink-jet method, flow coating method, roll coating method, casting method, Langmuir-Blodgett method and gravure coating method may be mentioned.

EXAMPLES

Now, the present invention will be described in further detail with reference to Examples, but the present invention is not limited to these Examples. Amounts of the respective components are based on mass. Among Ex. 1 to 36, Ex. 2 to 4, 10 to 12, 23, 24, 26, 27, 29, 32 and 32 are Examples of the present invention, and Ex. 1, 5, 6, 9, 13, 17, 21, 22, 25, 28, 30, 31 and 33 are Comparative Examples. Ex. 7, 8, 14 to 16, 18 to 20 and 34 to 36 are Reference Examples.

Evaluation Methods (Ratio)

The composition was analyzed by $^{19}$F-NMR to obtain the above ratio 1 or 2 with respect to the fluorinated ether compounds contained in the composition.

(Method for Measuring Water Contact Angle)

The contact angle of about 2 μL of distilled water (water contact angle) placed on the surface of the surface layer, was measured by using a contact angle measuring apparatus (DM-500, trade name, manufactured by Kyowa Interface Science Co., Ltd.). Measurements were conducted at five different points on the surface of the surface layer, and the average value was calculated and taken as the initial contact angle. For the calculation of the contact angle, a 2θ method was employed. The evaluation standards are shown below.
  ○ (excellent): initial contact angle being at least 100 degrees.
  x (poor): initial contact angle being less than 100 degrees.

(Abrasion Resistance Test Method)

With respect to the surface layer, in accordance with JIS L0849:2013(ISO 105-X12:2001), using a reciprocating traverse testing machine (manufactured by KNT Co.), the surface layer was rubbed with a cellulose nonwoven fabric (BEMCOT M-3, trade name, manufactured by Asahi Kasei Corporation) 10,000 reciprocations under a load of 1 kg at a rate of 320 cm/min, whereupon the water contact angle was measured. The evaluation standards are shown below. The smaller the decrease in water contact angle after the friction, the smaller the decrease in performance due to friction, and the better the abrasion resistance.
  ⊚ (excellent): The decrease in water contact angle after 10,000 reciprocations being at most 10 degrees.
  ○ (good): The decrease in water contact angle after 10,000 reciprocations being more than 10 degrees and at most 15 degrees.
  x (poor): The decrease in water contact angle after 10,000 reciprocations being more than 15 degrees.

(Sliding Resistance Test Method)

An automatic contact angle meter (DMo-701, trade name, manufactured by Kyowa Interface Science Co., Ltd.) having the surface horizontally held was prepared. On the surface (horizontal plane) of a polyethylene sheet (rigid polyethylene sheet (high density polyethylene), trade name, manufactured by HAGITEC CO. LTD.), an article (surface layer-provided substrate) was placed so that the surface of the surface layer was in contact with the polyethylene sheet, and then gradually inclined using the automatic contact angle meter, and the angle (sliding angle) formed by the surface of the surface layer and the horizontal plane when the article started sliding down, was measured. The evaluation standards are shown below. Measurement was conducted under conditions of an area of contact between the article and the polyethylene sheet of 6 cm×6 cm, a load applied to the article of 0.98 N.
  ⊚ (excellent): The sliding angle being at least 5 degrees.
  ○ (good): The sliding angle being at least 2 degrees and less than 5 degrees.
  x (poor): The sliding angle being less than 2 degrees.

Preparation Example 1

Mixtures CB-1a, CB-1 b, CB-1c and CB-1d containing compound (1-A) and compound (2-A) were prepared in accordance with the following procedure.

Preparation Example 1-1

Compound (X1-1) was obtained in accordance with Ex. 1-1 of WO2013-121984.

$CF_2$=$CFO$—$CF_2CF_2CF_2CH_2OH$ (X1-1)

Preparation Example 1-2

Into a 100 mL stainless steel reactor, 10 g of the compound (X1-1) obtained in Preparation Example 1-1 was put, followed by stirring at 175° C. for 200 hours. The resulting organic phase was concentrated to obtain 6 g of compound (X1-2).

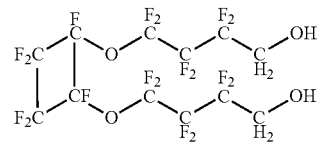
(X1-2)

NMR spectrum of compound (X1-2):
$^1$H-NMR (300.4 MHz, solvent: CDCl$_3$, reference: tetramethylsilane (TMS)) δ (ppm): 4.1 (4H)
$^{19}$F-NMR (282.7 MHz, solvent: CDCl$_3$, reference: CFCl$_3$) δ(ppm): −80 (2F), −85 (2F), −123 (4F), −126 (4F), −128 (2F), −131 (2F), −137 (1F), −139 (1F)

Preparation Example 1-3

Into a 200 mL eggplant flask, 5 g of the compound (X1-2) obtained in Preparation Example 1-2 and 1.2 g of potassium carbonate were put, followed by stirring at 120° C., and 25 g of the compound (X1-1) was added, followed by stirring at 120° C. for 2 hours. The temperature was returned to 25°

C., 30 g each of AC-2000 (trade name, manufactured by AGC Inc., $C_6F_{13}H$) and hydrochloric acid were put, followed by liquid separation, and the resulting organic phase was concentrated. The obtained reaction crude liquid was purified by column chromatography to obtain 21 g (yield: 70%) of compound (X1-3).

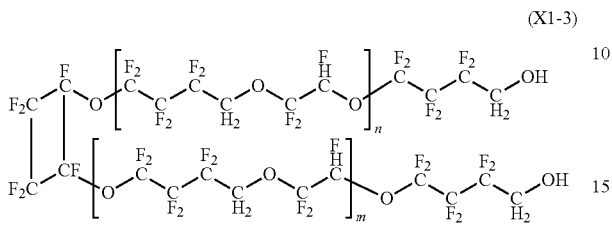
(X1-3)

NMR spectrum of compound (X1-3):
$^1$H-NMR (300.4 MHz, solvent: $CDCl_3$, reference: tetramethylsilane (TMS)) δ(ppm): 6.0 (10H), 4.6 (20H), 4.1 (4H)
$^{19}$F-NMR (282.7 MHz, solvent: $CDCl_3$, reference: $CFCl_3$) δ(ppm): −80 (2F), −85 (22F), −91 (20F), −120 (20F), −123 (4F), −126 (24F), −128 (2F), −131 (2F), −137 (1F), −139 (1F), −144 (10F)
Average of numbers m+n of units: 10

Preparation Example 1-4

Into a 50 mL eggplant flask to which a reflux condenser was connected, 20 g of the compound (X1-3) obtained in Preparation Example 1-3, 7.1 g of a sodium fluoride powder, 20 g of AC-2000 and 20 g of $CF_3CF_2CF_2OCF(CF_3)COF$ were added. In a nitrogen atmosphere, the mixture was stirred at 50° C. for 24 hours. After cooling to room temperature, the sodium fluoride powder was removed by a pressure filter, and excess $CF_3CF_2CF_2OCF(CF_3)COF$ and AC-2000 were distilled off under reduced pressure to obtain 24 g (yield: 100%) of compound (X1-4).

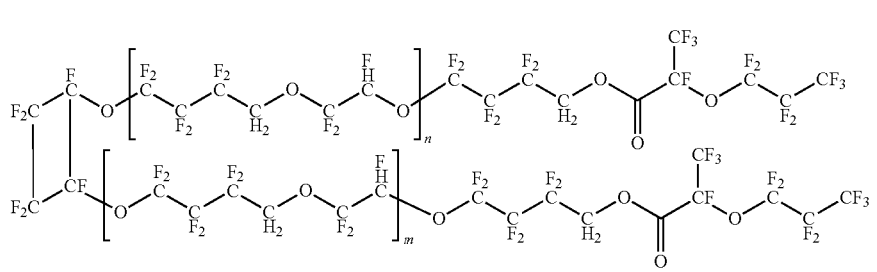
(X1-4)

NMR spectrum of compound (X1-4):
$^1$H-NMR (300.4 MHz, solvent: $CDCl_3$, reference: tetramethylsilane (TMS)) δ (ppm): 6.0 (10H), 5.0 (4H), 4.6 (20H)
$^{19}$F-NMR (282.7 MHz, solvent: $CDCl_3$, reference: $CFCl_3$) δ(ppm): −79 (4F), −80 (2F), −81 (6F), −82 (6F), −85 (22F), −91 (20F), −119 (4F), −120 (20F), −126 (24F), −128 (2F), −129 (4F), −131 (2F), −131 (2F), −137 (1F), −139 (1F), −144 (10F)
Average of numbers m+n of units: 10

Preparation Example 1-5

Into a 500 mL nickel reactor, 250 mL of $ClCF_2CFClCF_2OCF_2CF_2Cl$ (hereinafter referred to as "CFE-419") was put, followed by bubbling with nitrogen gas. After the oxygen gas concentration was sufficiently decreased, bubbling with 20 vol % fluorine gas diluted with nitrogen gas was conducted for 1 hour. A CFE-419 solution (concentration: 10%, compound (X1-4): 20 g) of the compound (X1-4) obtained in Preparation Example 1-4 was charged over 3 hours. The ratio of the rate (mol/hour) of introduction of fluorine gas to the rate (mol/hour) of introduction of hydrogen atoms in the compound (X1-4) was controlled to be 2:1. After the charge of the compound (X1-4), a CFE-419 solution (concentration: 0.1%, benzene: 0.1 g) of benzene was intermittently charged. After the charge of benzene, bubbling with fluorine gas was conducted for 1 hour, and finally the system in the reactor was sufficiently replaced with nitrogen gas. The solvent was distilled off to obtain 21 g (yield: 90%) of a mixture containing compound (X1-5) as the main component.

(X1-5)

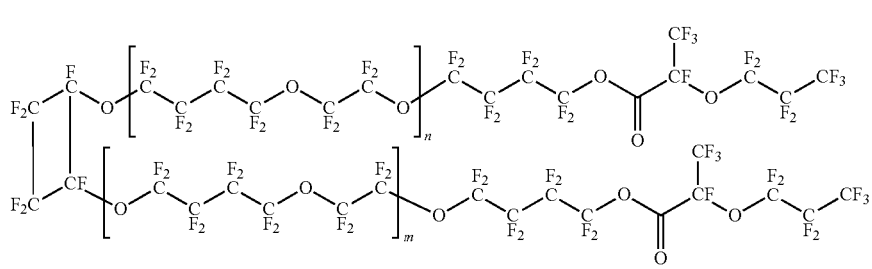

NMR spectrum of compound (X1-5):
$^{19}$F-NMR (282.7 MHz, solvent: CDCl$_3$, reference: CFCl$_3$) δ(ppm): −79 (4F), −80 (2F), −81 (6F), −82 (6F), −83 (46F), −87 (40F), −124 (48F), −128 (2F), −129 (4F), −131 (2F), −131 (2F), −137 (1F), −139 (1F).
Average of numbers m+n of units: 10.

Preparation Example 1-6

Into a 50 mL eggplant flask, 20 g of the mixture containing the compound (X1-5) as the main component obtained in Preparation Example 1-5, 1.8 g of sodium fluoride and 20 mL of AC-2000 were put, followed by stirring in an ice bath. 1.4 g of methanol was put, followed by stirring at 25° C. for 1 hour. The mixture was subjected to filtration, and the filtrate was purified by column chromatography to obtain 14 g (yield: 80%) of a mixture containing compound (X1-6) as the main component.

(X1-6)

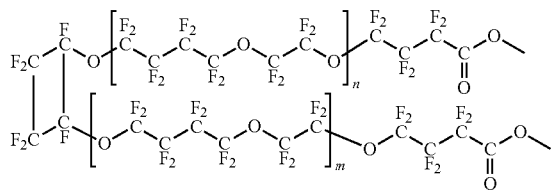

NMR spectrum of compound (X1-6):
$^1$H-NMR (300.4 MHz, solvent: CDCl$_3$, reference: tetramethylsilane (TMS)) δ(ppm): 4.2 (6H).
$^{19}$F-NMR (282.7 MHz, solvent: CDCl$_3$, reference: CFCl$_3$) δ(ppm): −80 (2F), −83 (42F), −87 (40F), −119 (4F), −124 (44F), −128 (2F), −131 (2F), −137 (1F), −139 (1F).
Average of numbers m+n of units: 10.

Preparation Example 1-7

Into a 50 mL eggplant flask, 12 g of a mixture containing compound (X1-6) obtained in Preparation Example 1-6 as the main component, 1.5 g of H$_2$NCH$_2$C(CH$_2$CH=CH$_2$)$_3$ and 12 mL of AC-2000 were put, followed by stirring at 0° C. for 24 hours. The reaction crude liquid was purified by column chromatography to obtain three fractions each containing the desired product. 9 g (yield: 70%) of compound (X1-7) was obtained in total. The respective three fractions were taken as (C1-7a), (C-1-7b) and (C-1-7c), and a part of the fraction (C1-7c) was further purified by column chromatography to obtain fraction (C1-7d).

The fractions (C1-7a) to (C1-7d) contained compounds (X1-7) and (X1-8). Using the respective fractions, the ratio (CF$_3$/CF$_2$) corresponding to the above ratio 1 was obtained by $^{19}$F-NMR. CF$_3$ in the ratio means the number of moles of the —CF$_3$ group present at one terminal of the compound (X1-8) (—CF$_3$ group surrounded by the dotted line in the formula), and is observed at −85 to −87 ppm in the $^{19}$F-NMR spectrum. Further, CF$_2$ in the ratio means the total number of moles of the —CF$_2$— groups present in the vicinity of one terminal of the compound (X1-8) (—CF$_2$— group surrounded by the dotted line in the formula) and the —CF$_2$— groups present in the vicinity of both terminals of the compound (X1-7) (—CF$_2$— groups surrounded by the dotted line in the formula), and is observed at −120 ppm in the $^{19}$F-NMR spectrum.

CF$_3$/CF$_2$ in fraction (C1-7a)=0.12
CF$_3$/CF$_2$ in fraction (C1-7b)=0.08
CF$_3$/CF$_2$ in fraction (C1-7c)=0.06
CF$_3$/CF$_2$ in fraction (C1-7d)=0.002

(X1-7)

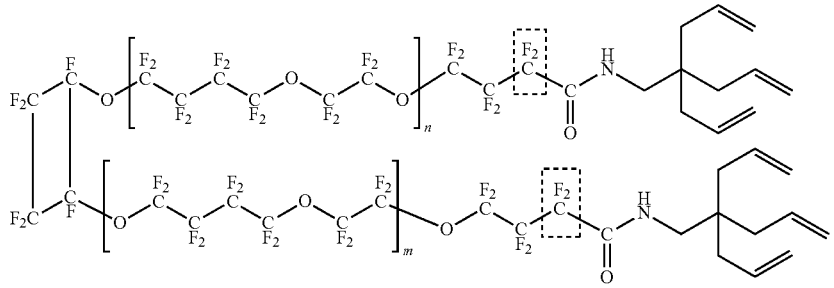

NMR spectrum of compound (X1-7):
¹H-NMR (300.4 MHz, solvent: CDCl₃, reference: tetramethylsilane (TMS)) δ(ppm): 6.1 (6H), 5.2 (12H), 3.4 (4H), 2.1 (12H).
¹⁹F-NMR (282.7 MHz, solvent: CDCl₃, reference: CFCl₃) δ(ppm): −80 (2F), −83 (42F), −87 (40F), −120 (4F), −124 (44F), −128 (2F), −131 (2F), −137 (1F), −139 (1F).
Average of numbers m+n of units: 10.

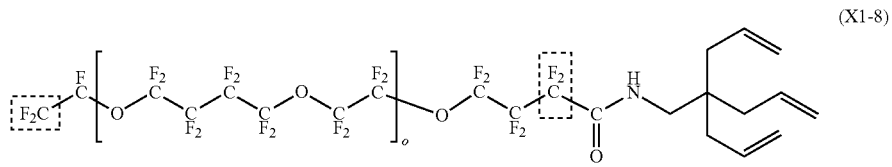

Preparation Example 1-8

Into a 50 mL eggplant flask, 1 g of the fraction (C1-7a) obtained in Preparation Example 1-7, 0.21 g of trimethoxysilane, 0.001 g of aniline, 1.0 g of AC-6000 (trade name, manufactured by AGC Inc., C₆F₁₃C₂H₅) and 0.0033 g of a platinum/1,3-divinyl-1,1,3,3-tetramethyldisiloxane complex were put, followed by stirring at 25° C. overnight. The solvent and the like were distilled off to obtain 1.2 g (yield: 100%) of mixture (CB-1a) containing compound (2-A).

Further, mixtures (CB-1b), (CB-1c) and (CB-1d) were obtained in the same manner as the production of the mixture (CB-1a) except that the fraction (C1-7b), (C1-7c) or (C1-7d) was used instead of the fraction (C1-7a).

The respective mixtures contained compound (1-A) and compound (2-A).

Using the respective mixtures, the ratio 1 was obtained in the same manner as in Preparation Example 1-7 by ¹⁹F-NMR. The groups surrounded by the dotted line in the formulae are groups measured by ¹⁹F-NMR.

Ratio 1 in mixture (CB-1a)=0.12
Ratio 1 in mixture (CB-1 b)=0.08
Ratio 1 in mixture (CB-1c)=0.06
Ratio 1 in mixture (CB-1 d)=0.002

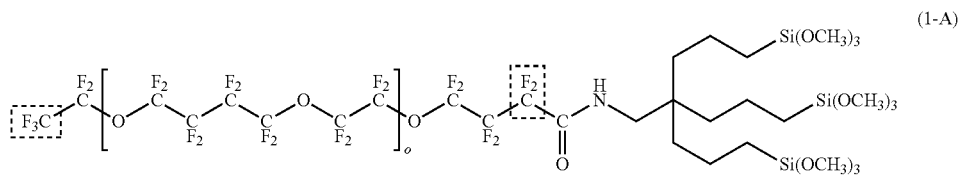

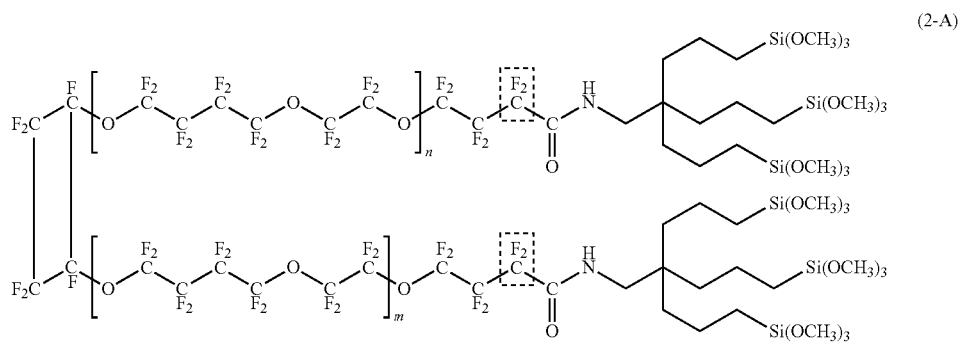

NMR spectrum of compound (2-A):
¹H-NMR (300.4 MHz, solvent: CDCl₃, reference: tetramethylsilane (TMS)) δ(ppm): 3.6 (54H), 3.4 (4H), 1.3 (24H), 0.9 (12H).
¹⁹F-NMR (282.7 MHz, solvent: CDCl₃, reference: CFCl₃) δ(ppm): −80 (2F), −83 (42F), −87 (40F), −120 (4F), −124 (44F), −128 (2F), −131 (2F), −137 (1F), −139 (1F).
Average of numbers m+n of units: 10.

Preparation Example 2

Mixtures (CB-2a) to (CB-2d) were obtained in the same manner as in Preparation Examples 1-1 to 1-8 except that H₂NCH₂C(CH₂CH=CH₂)₃ used in Preparation Example 1-7 was changed to H₂NCH₂CH(CH₂CH=CH₂)₂.
The respective mixtures contained compound (1-B) and compound (2-B).
Using the respective mixtures, the ratio 1 was obtained in the same manner as in Preparation Example 1-7 by ¹⁹F-NMR. The groups surrounded by the dotted line in the formulae are groups measured by ¹⁹F-NMR.
Ratio 1 in mixture (CB-2a)=0.17
Ratio 1 in mixture (CB-2b)=0.11
Ratio 1 in mixture (CB-2c)=0.04
Ratio 1 in mixture (CB-2d)=0.001 for 2 hours. The temperature was returned to 25° C., and 50 g each of AC-2000 and hydrochloric acid were put, followed by liquid separation, and the resulting organic phase was concentrated. The obtained reaction crude liquid was purified by column chromatography to obtain 117.7 g (yield: 40%) of compound (X3-1).

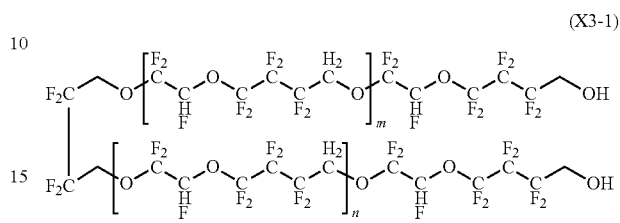

(X3-1)

NMR spectrum of compound (X3-1):
¹H-NMR (300.4 MHz, solvent: CDCl₃, reference: tetramethylsilane (TMS)) δ (ppm): 6.0 (12H), 4.6 (20H), 4.2 (4H), 4.1 (4H).
¹⁹F-NMR (282.7 MHz, solvent: CDCl₃, reference: CFCl₃) δ(ppm): −85 (24F), −90 (24F), −120 (20F), −122 (4F), −123 (4F), −126 (24F), −144 (12F)

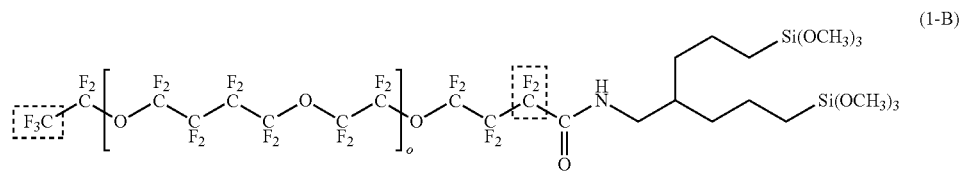

(1-B)

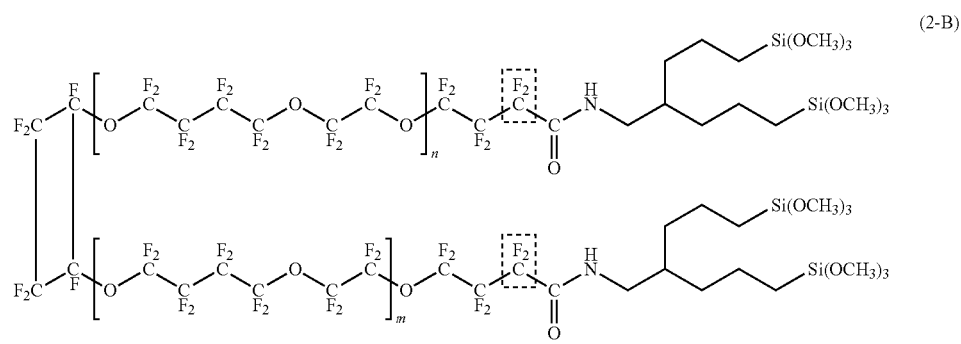

(2-B)

(Average of numbers m+n of units: 10)

Preparation Example 3

Mixtures (CC-1a), (CC-1b), (CC-1c) and (CC-1d) each containing compound (1-C) and compound (2-C) were prepared in accordance with the following procedure.

Preparation Example 3-1

Into a 200 mL eggplant flask, 16.2 g of HO—CH₂CF₂CF₂CH₂—OH and 13.8 g of potassium carbonate were put, followed by stirring 120° C., and 278 g of compound (X1-1) was added, followed by stirring at 120° C.

Average of numbers m+n of units: 10.

Preparation Example 3-2

Into a 50 mL eggplant flask to which a reflux condenser was connected, 20 g of compound (X3-1) obtained in Preparation Example 3-1, 2.4 g of a sodium fluoride powder, 20 g of AC-2000 and 18.8 g of CF₃CF₂CF₂OCF(CF₃)COF were added. In a nitrogen atmosphere, the mixture was stirred at 50° C. for 24 hours. After the temperature was returned to room temperature, the sodium fluoride powder was removed by a pressure filter, and excess CF₃CF₂CF₂OCF(CF₃)COF and AC-2000 were distilled off under reduced pressure to obtain 24 g (yield: 100%) of compound (X3-2).

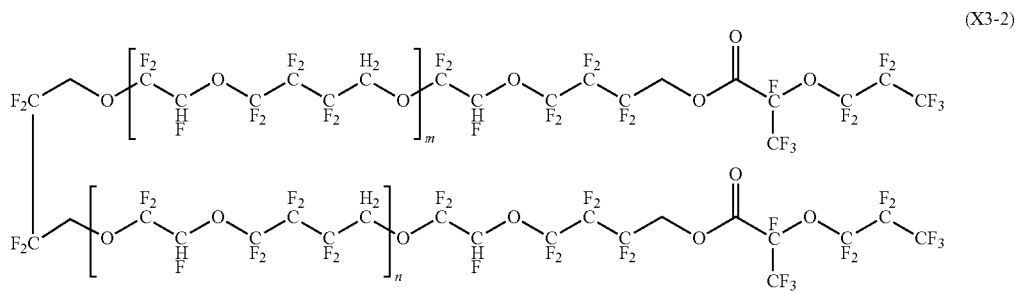

(X3-2)

NMR spectrum of compound (X3-2):

¹H-NMR (300.4 MHz, solvent: CDCl₃, reference: tetramethylsilane (TMS)) δ(ppm): 6.0 (12H), 5.0 (4H), 4.6 (20H), 4.2 (4H).

¹⁹F-NMR (282.7 MHz, solvent: CDCl₃, reference: CFCl₃) δ(ppm): −79 (4F), −81 (6F), −82 (6F), −85 (24F), −90 (24F), −119 (4F), −120 (20F), −122 (4F), −126 (24F), −129 (4F), −131 (2F), −144 (12F).

Average of numbers m+n of units: 10.

Preparation Example 3-3

Into a 500 mL nickel reactor, 250 mL of CFE-419 was put, followed by bubbling with nitrogen gas. After the oxygen gas concentration was sufficiently decreased, bubbling with 20 vol % fluorine gas diluted with nitrogen gas was conducted for 1 hour. A CFE-419 solution (concentration: 10%, compound (X3-2): 24 g) of the compound (X3-2) obtained in Preparation Example 3-2 was charged over 6 hours. The ratio of the rate (mol/hour) of introduction of fluorine gas to the rate (mol/hour) of introduction of hydrogen atoms in the compound (X3-2) was controlled to be 2:1. After the charge of the compound (X3-2), a CFE-419 solution (concentration: 0.1%, benzene: 0.1 g) of benzene was intermittently charged. After the charge of benzene, bubbling with fluorine gas was conducted for 1 hour, and finally the system in the reactor was sufficiently replaced with nitrogen gas. The solvent was distilled off to obtain 25.3 g (yield: 90%) of a mixture containing compound (X3-3) as the main component.

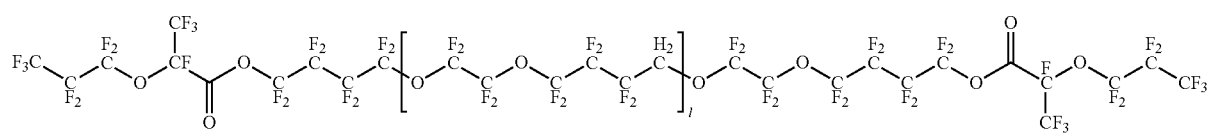

(X3-3)

NMR spectrum of compound (X3-3):

¹⁹F-NMR (282.7 MHz, solvent: CDCl₃, reference: CFCl₃) δ(ppm): −79 (4F), −81 (6F), −82 (6F), −83 (48F), −87 (44F), −124 (48F), −129 (4F), −131 (2F).

Average of number l of units: 10.

Preparation Example 3-4

Into a 50 mL eggplant flask, 25.3 g of the compound (mixture containing X³-3 as the main component) obtained in Preparation Example 3-3, 2.2 g of sodium fluoride and 25 mL of AC-2000 were put, followed by stirring in an ice bath. 1.7 g of methanol was put, followed by stirring at 25° C. for 1 hour. The mixture was subjected to filtration, and the filtrate was purified by column chromatography to obtain 15 g (yield: 80%) of a mixture containing compound (X3-4) as the main component.

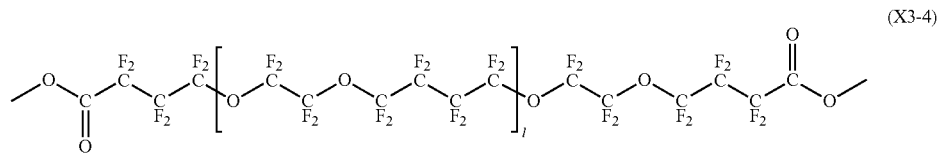

(X3-4)

NMR spectrum of compound (X3-4):
¹H-NMR (300.4 MHz, solvent: CDCl₃, reference: tetramethylsilane (TMS)) δ(ppm): 4.2 (6H).
¹⁹F-NMR (282.7 MHz, solvent: CDCl₃, reference: CFCl₃) δ(ppm): −83 (44F), −87 (44F), −119 (4F), −124 (44F). Average of number I of units: 10.

Preparation Example 3-5

Into a 50 mL eggplant flask, 15 g of a mixture containing compound (X3-4) obtained in Preparation Example 3-4 as the main component, 3.2 g of H₂NCH₂C(CH₂CH=CH₂)₃ and 15 mL of AC-2000 were put, followed by stirring at 0° C. for 24 hours. The reaction crude liquid was purified by column chromatography to obtain three fractions each containing the desired product. 11.2 g (yield: 70%) of compound (X³-5) was obtained in total. The respective three fractions were taken as (C3-5a), (C3-5b) and (C3-5c), and a part of the fraction (C3-5c) was further purified by column chromatography to obtain fraction (C3-5d).

The fractions (C3-5a) to (C3-5d) contained compound (X3-5) and compound (X3-6). Using the respective fractions, the ratio (CF₃/CF₂) corresponding to the above ratio 1 was obtained by ¹⁹F-NMR. CF₃ in the ratio means the number of moles of the —CF₃ group present at one terminal of the compound (X3-6) (—CF₃ group surrounded by the dotted line in the formula), and is observed at −85 to −87 ppm in the ¹⁹F-NMR spectrum. Further, CF₂ in the ratio means the total number of moles of the —CF₂— group present in the vicinity of one terminal of the compound (X3-6) (—CF₂— group surrounded by the dotted line in the formula) and the —CF₂— group present in the vicinity of both terminals of the compound (X3-5) (—CF₂— group surrounded by the dotted line in the formula), and is observed at −120 ppm in the ¹⁹F-NMR spectrum.

CF₃/CF₂ in fraction (C3-5a)=0.11
CF₃/CF₂ in fraction (C3-5b)=0.06
CF₃/CF₂ in fraction (C3-5c)=0.05
CF₃/CF₂ in fraction (C3-5d)=0.003

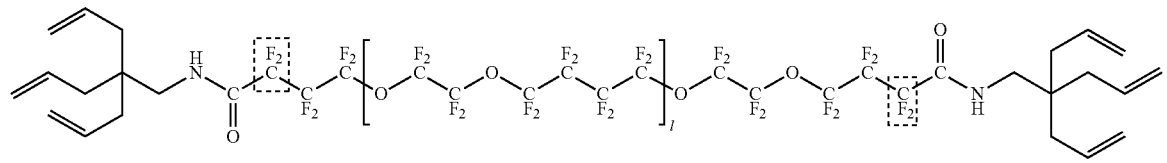

(X3-5)

NMR spectrum of compound (X3-5):
¹H-NMR (300.4 MHz, solvent: CDCl₃, reference: tetramethylsilane (TMS)) δ(ppm): 6.1 (6H), 5.2 (12H), 3.4 (4H), 2.1 (12H).
¹⁹F-NMR (282.7 MHz, solvent: CDCl₃, reference: CFCl₃) δ(ppm): −83 (44F), −87 (44F), −120 (4F), −124 (44F). Average of number I of units: 10.

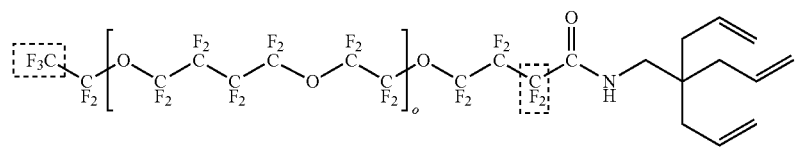

(X3-6)

Preparation Example 3-6

Into a 50 mL eggplant flask, 1 g of the fraction (C3-5a) obtained in Preparation Example 3-5, 0.21 g of trimethoxysilane, 0.001 g of aniline, 1.0 g of AC-6000 and 0.0033 g of a platinum/1,3-divinyl-1,1,3,3-tetramethyldisiloxane complex were put, followed by stirring at 25° C. overnight. The solvent and the like were distilled off to obtain 1.2 g (yield: 100%) of mixture (CC-1a).

Further, mixtures (CC-1b), (CC-1c) and (CC-1d) were obtained in the same manner as the production of the mixture (CC-1a) except that the fraction (C3-5b), (C3-5c) or (C$_{3-5}$d) was used instead of the fraction (C3-5a).

The respective mixtures contained compound (1-C) and compound (2-C). Using the respective mixtures, the ratio 1 was obtained in the same manner as in Preparation Example 3-5 by $^{19}$F-NMR. The groups surrounded by the dotted line in the formulae are groups measured by $^{19}$F-NMR.

Ratio 1 in mixture (CC-1a)=0.11
Ratio 1 in mixture (CC-1 b)=0.06
Ratio 1 in mixture (CC-1c)=0.05
Ratio 1 in mixture (CC-1 d)=0.003

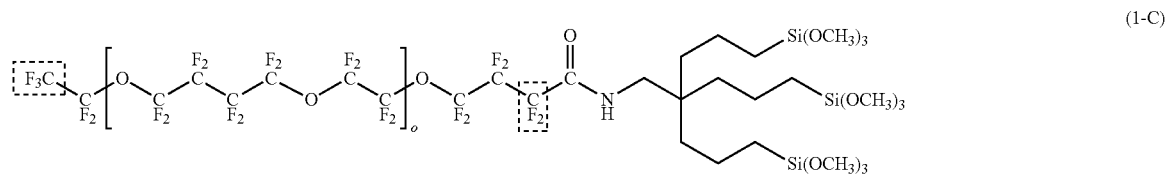

(1-C)

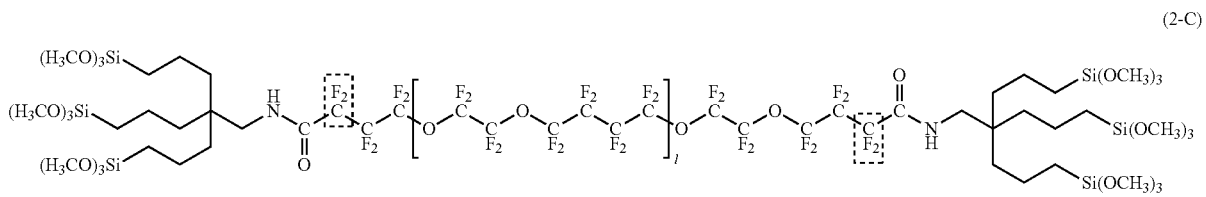

(2-C)

NMR spectrum of compound (2-C):
$^{1}$H-NMR (300.4 MHz, solvent: CDCl$_3$, reference: tetramethylsilane (TMS)) δ (ppm): 3.6 (54H), 3.4 (4H), 1.3 (24H), 0.9 (12H).
$^{19}$F-NMR (282.7 MHz, solvent: CDCl$_3$, reference: CFCl$_3$) δ(ppm): −83 (44F), −87 (44F), −120 (4F), −124 (44F). Average of number I of units: 10.

Preparation Example 4

Mixtures (CC-2a) to (CC-2d) were obtained in the same manner as in Preparation Examples 3-1 to 1-6 except that H$_2$NCH$_2$C(CH$_2$CH=CH$_2$)$_3$ used in Preparation Example 3-5 was changed to H$_2$NCH$_2$CH(CH$_2$CH=CH$_2$)$_2$.

The respective mixtures contained compound (1-D) and compound (2-D). Using the respective mixtures, the ratio 1 was obtained in the same manner as in Preparation Example 3-5 by $^{19}$F-NMR. The groups surrounded by the dotted line in the formulae are groups measured by $^{19}$F-NMR.

Ratio 1 in mixture (CC-2a)=0.13
Ratio 1 in mixture (CC-2b)=0.09
Ratio 1 in mixture (CC-2c)=0.06
Ratio 1 in mixture (CC-2d)=0.005

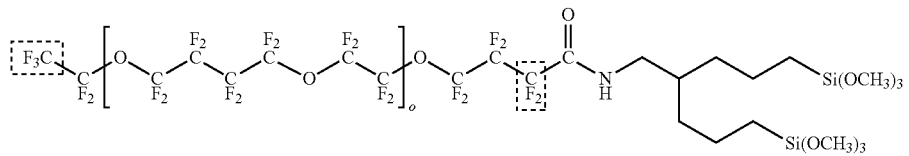
(1-D)

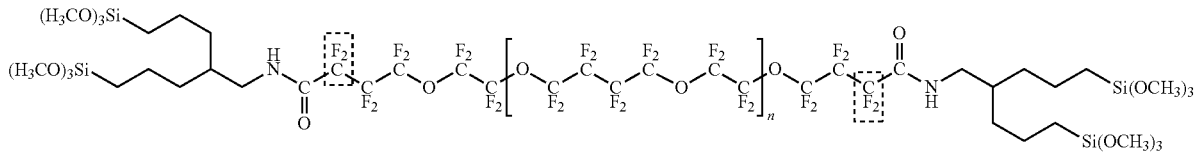
(2-D)

Preparation Example 5

Compound (1-E) was obtained in accordance with the method described in Example 11 of WO2017/038830. By $^{19}$F-NMR, the —CF$_3$ group at one terminal of the compound (1-E) was observed at −55 to −56 ppm, and the —CF$_2$— group bonded to —C(O)NH—CH$_2$—C[CH$_2$CH$_2$CH$_2$—Si(OCH$_3$)$_3$]$_3$ at the other terminal of the compound (1-E) was observed at −118 to −122 ppm.

CF$_3$—(OCF$_2$CF$_2$—OCF$_2$CF$_2$CF$_2$CF$_2$)$_n$OCF$_2$CF$_2$—O—CF$_2$CF$_2$CF$_2$C(O)NH—CH$_2$—C[CH$_2$CH$_2$CH$_2$—Si(OCH$_3$)$_3$]$_3$ (1-E)

Preparation Example 6

Compound (2-E) and compound (1-F) were obtained in accordance with the method described in Examples of JP-A-2015-199906. By $^{19}$F-NMR, the —CF$_3$ group surrounded by the dotted line in the formula was observed at −57 to −60 ppm, and the —CF$_2$— groups surrounded by the dotted line in the formulae were observed at −78 to −85 ppm.

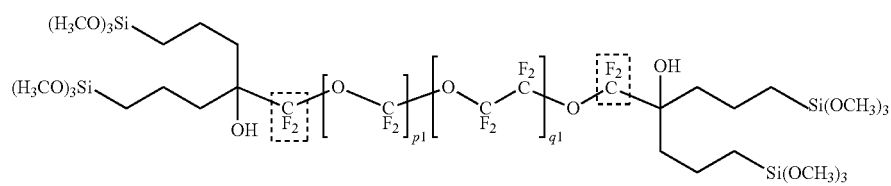
(2-E)

(p1:q1 ≒ 1:1, p1+q1 ≒ 40)

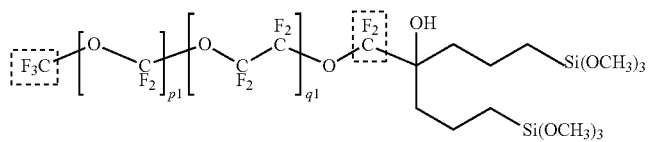
(1-F)

(p1:q1 ≒ 1:1, p1+q1 ≒ 40)

Preparation Example 7

Compound (1-G) was obtained in accordance with the method described in Examples of Japanese Patent No. 6296200. By $^{19}$F-NMR, the —CF$_3$ group at one terminal of the compound (1-G) was observed at −57 to −60 ppm, and the —CF$_2$— group bonded to —CH$_2$CH$_2$CH$_2$Si[CH$_2$CH$_2$CH$_2$Si(OCH$_3$)$_3$]$_3$ at the other terminal of the compound (1-G) was observed at −78 to −85 ppm.

CF$_3$(OCF$_2$CF$_2$)$_m$(OCF$_2$)$_n$OCF$_2$CH$_2$CH$_2$CH$_2$Si[CH$_2$CH$_2$CH$_2$Si(OCH$_3$)$_3$]$_3$ (1-G)

(m:n≈1:1, m+n≈40)

Preparation Example 8

Compound (2-F) was obtained in the same manner as in Preparation Example 7 except that the starting material was changed from CF$_3$(OCF$_2$CF$_2$)$_m$(OCF$_2$)$_n$OCF$_2$CH$_2$CH=CH$_2$ to CH$_2$=CHCH$_2$CF$_2$(OCF$_2$CF$_2$)$_m$(OCF$_2$)$_n$OCF$_2$CH$_2$CH=CH$_2$. By $^{19}$F-NMR, the —CF$_2$— group bonded to [(CH$_3$O)$_3$SiCH$_2$CH$_2$CH$_2$]$_3$SiCH$_2$CH$_2$CH$_2$— at both terminals of the compound (2-F) was observed at from −78 to −85 ppm.

[(CH$_3$O)$_3$SiCH$_2$CH$_2$CH$_2$]$_3$SiCH$_2$CH$_2$CH$_2$CF$_2$(OCF$_2$CF$_2$)$_m$(OCF$_2$)$_n$OCF$_2$CH$_2$CH$_2$CH$_2$Si[CH$_2$CH$_2$CH$_2$Si(OCH$_3$)$_3$]$_3$ (2-F)

(m:n≈1:1, m+n≈40)

Preparation Example 9

Compound (2-G) was prepared in accordance with the following procedure.

Preparation Example 9-1

Into a 1,000 mL eggplant flask, 13.3 g of a 6% aqueous potassium bromide solution, 250.2 g of acetonitrile, 0.27 g of 2,2,6,6-tetramethylpiperidine 1-oxyl and 250.2 g of Fomblin D4000 (manufactured by Solvay Solexis) were added, and 220.0 g of sodium chlorite and 23.6 g of sodium hydrogencarbonate were added, followed by stirring at room temperature for 4 hours. Then, 580 g of AC-2000 and 300 g of 10% sulfuric acid were added, followed by liquid separation, and the resulting organic layer was concentrated to obtain 237.56 g (yield: 94%) of compound (X9-1).

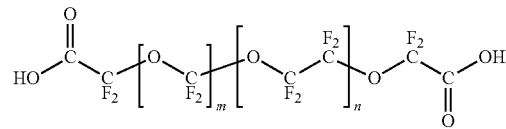
(X9-1)

NMR spectrum of compound (X9-1):
$^{19}$F-NMR (ppm): −53 (42F), −78 (2F), −79 (2F), −89 (92F).

Average of m: 21, average of n: 23.

Preparation Example 9-2

Into a 500 mL eggplant flask to which a reflux condenser was connected, 130.7 g of the compound (X9-1) and 38.4 g of methanol were added, and 130.5 g of AC-2000 as a solvent was added, followed by stirring under reflux for 48 hours. The mixture was concentrated to obtain 130.66 g (yield: 100%) of compound (X9-2).

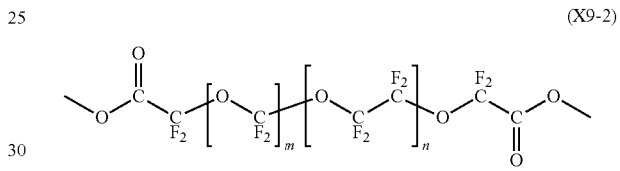
(X9-2)

NMR spectrum of compound (X9-2):
$^1$H-NMR (ppm): 3.9 (6H).
$^{19}$F-NMR (ppm): −53 (42F), −77 (2F), −79 (2F), −89 (92F).

Average of m: 21, average of n: 23.

Preparation Example 9-3

Into a 100 mL eggplant flask, 40.6 g of the compound (X9-2), 3.72 g of H$_2$NCH$_2$C(CH$_2$CH=CH$_2$)$_3$ and 45.7 g of AC-2000 as a solvent were put, followed by stirring at room temperature for 1 hour. The obtained crude liquid was purified by silica gel column chromatography to obtain 23.4 g of compound (X9-3).

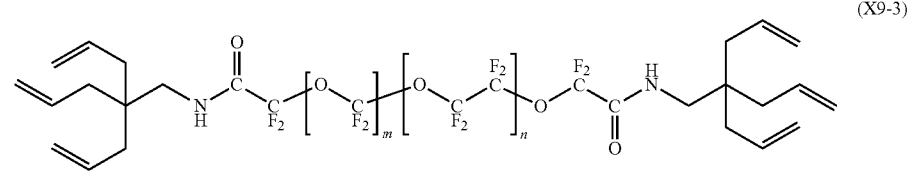
(X9-3)

NMR spectrum of compound (X9-3):
$^1$H-NMR (ppm): 6.0 (6H), 5.2 (12H), 3.4 (4H), 2.2 (12H).
$^{19}$F-NMR (ppm): −53 (42F), −78 (2F), −79 (2F), −89 (92F).
Average of m: 21, average of n: 23.

Preparation Example 9-4

Into a 10 mL eggplant flask, 1.0 g of the compound (X9-3) obtained in Preparation Example 9-3, 0.03 g of a xylene solution (platinum content: 3 mass %) of a platinum/1,3-divinyl-1,1,3,3-tetramethyldisiloxane complex, 0.25 g of trimethoxysilane, 0.002 g of aniline and 3.2 g of AC-6000 were put, followed by stirring at 40° C. for 3 hours. The solvent and the like were distilled off under reduced pressure to obtain 1.0 g of compound (2-G). The —CF$_2$— groups surrounded by the dotted line in the formula are groups measured by $^{19}$F-NMR, and were observed in the vicinity of from −78 to −80 ppm.

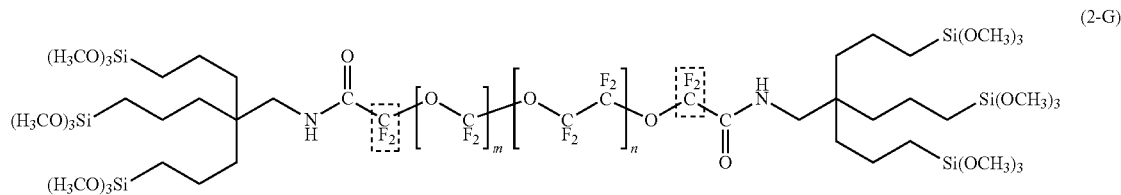
(2-G)

NMR spectrum of compound (2-G):
$^1$H-NMR (ppm): 3.5 (54H), 3.2 (4H), 1.3 (24H), 0.6 (12H).
$^{19}$F-NMR (ppm): −53 (42F), −78 (2F), −79 (2F), −89 (92F).
Average of m: 21, average of n: 23.

Preparation Example 10

1.0 g of compound (2-H) was obtained in the same manner as in Preparation Examples 9-1 to 9-4 except that the amine used in Preparation Example 9-3 was changed from H$_2$NCH$_2$C(CH$_2$CH=CH$_2$)$_3$ to H$_2$NCH$_2$CH(CH$_2$CH=CH$_2$)$_2$. The —CF$_2$— groups surrounded by the dotted line in the formula are groups measured by $^{19}$F-NMR and were observed in the vicinity of −80 ppm.

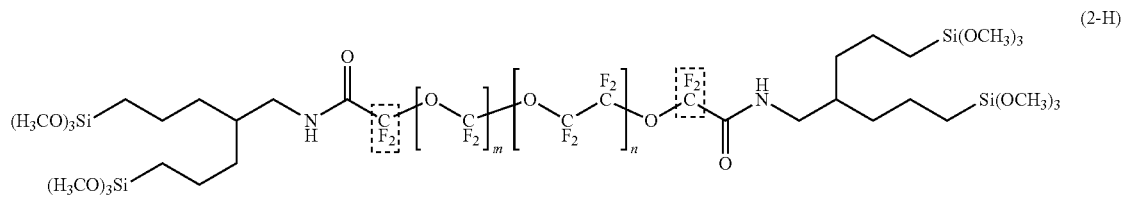
(2-H)

NMR spectrum of compound (2-H):
$^1$H-NMR (ppm): 3.4 (36H), 3.2 (4H), 1.6 (2H), 1.4 (16H), 0.6 (8H).
$^{19}$F-NMR (ppm): −53 (42F), −78 (2F), −79 (2F), −89 (92F).

Average of m: 21, average of n: 23.

Preparation Example 11

Fomblin M03 (trade name, manufactured by Solvay Solexis) was purchased and purified by silica gel column chromatography to obtain compound (3-A). The number average molecular weight of the compound (3-A) was about 4,000. The —CF$_3$ groups surrounded by the dotted line in the formula are groups measured by $^{19}$F-NMR and were observed at −57 to −60 ppm.

$$[F_3C]-\left[O-\underset{F_2}{C}\right]_{p1}-\left[O-\underset{F_2}{\overset{F_2}{C}}\right]_{q1}-O-[CF_3] \quad (3\text{-}A)$$

(m+n ≒ 40, m:n ≒ 1)

Preparation Example 12

Preparation Example 12-1

Into a 100 mL pressure resistant reactor, 15 g of the compound (X3-4) obtained in the same manner as in Preparation Example 3, 50 g of AK-225, and 7.5 g of a 2.0 M ammonia-methanol solution were put, followed by stirring at room temperature for 6 hours. Then, the solvent was distilled off to obtain 15.0 g (yield: 100%) of the desired compound (X12-1).

$$H_2NC(=O)CF_2CF_2CF_2-(OCF_2CF_2-OCF_2CF_2CF_2CF_2)_l-OCF_2CF_2-OCF_2CF_2CF_2C(=O)NH_2 \quad (X12\text{-}1)$$

NMR spectrum of compound (X12-1):
$^{19}$F-NMR: −83 (44F), −87 (44F), −120 (4F), −124 (44F)

Preparation Example 12-2

Into a 300 mL eggplant flask, 15 g of the compound (X12-1), 75 g of AK-225 and 30 g of diethyl ether were added, followed by stirring in an ice bath. Then, 0.70 g of lithium aluminum hydride was slowly added, followed by stirring at room temperature for 20 hours. 0.3 mL of a saturated aqueous sodium sulfate solution was added, and the precipitated solid was removed by celite filtration. The obtained filtrate was concentrated and purified by silica gel column chromatography to obtain 9.8 g (yield: 65%) of the desired compound (X12-2).

$$H_2NCH_2CF_2CF_2CF_2-(OCF_2CF_2-OCF_2CF_2CF_2CF_2)_l-OCF_2CF_2-OCF_2CF_2CF_2CH_2NH_2 \quad (X12\text{-}2)$$

NMR spectrum of compound (X12-2):
$^1$H-NMR: 3.2 (4H)
$^{19}$F-NMR: −83 (44F), −87 (44F), −122 (4F), −124 (44F)

Preparation Example 12-3

Into a 50 mL eggplant flask, 1.5 g of HO(C=O)C(CH$_2$CH=CH$_2$)$_3$, 60 mL of dichloromethane and 1.5 mL of oxalyl chloride were added, followed by stirring in an ice bath, and 0.01 g of DMF was added. The mixture was stirred at room temperature for 3 hours and concentrated to obtain 1.4 g of Cl(C=O)C(CH$_2$CH=CH$_2$)$_3$.

Separately, into a 50 mL cc eggplant flask, 9.0 g of the compound (X12-2) and 2.1 mL of triethylamine were added, and the above Cl(C=O)C(CH$_2$CH=CH$_2$)$_3$ and 1,3-bistrifluoromethylbenzene were added. The mixture was stirred for 1 hour, and the solvent was distilled off. The obtained crude product was separated into three fractions each containing the desired products, of which compound (X12-3) was obtained in an amount of 6.6 g (yield: 70%). The three fractions were taken as (C12-3a), (C12-3b) and (C12-3c), and a part of the fraction (C12-3c) was further purified by column chromatography to obtain (C12-3d).

The fractions (C12-3a) to (C12-3d) contained compound (X12-3) and compound (X$^{12}$-4). Using the respective fractions, the ratio (CF$_3$/CF$_2$) corresponding to the above ratio 1 was obtained by $^{19}$F-NMR. CF$_3$ in the ratio means the number of moles of the —CF$_3$ group present at one terminal of the compound (X12-4) (—CF$_3$ group underlined in the formula), and is observed at −85 to −87 ppm in the $^{19}$F-NMR spectrum. Further, CF$_2$ in the ratio means the total number of moles of the —CF$_2$— group present in the vicinity of one terminal of the compound (X3-6) (—CF$_2$— group underlined in the formula) and the —CF$_2$— groups present in the vicinity of both terminals of the compound (X3-5) (—CF$_2$— groups underlined in the formula), and is observed at −120 ppm in the $^{19}$F-NMR spectrum.

CF$_3$/CF$_2$ in fraction (C12-3a)=0.18
CF$_3$/CF$_2$ in fraction (C12-3b)=0.09
CF$_3$/CF$_2$ in fraction (C12-3c)=0.04
CF$_3$/CF$_2$ in fraction (C12-3d)=0.004

$$(CH_2=CHCH_2)_3C(=O)NHCH_2\underline{CF_2}CF_2CF_2O-\\(CF_2CF_2O-CF_2CF_2CF_2CF_2\underline{O})_j-CF_2CF_2O-\\CF_2CF_2\underline{CF_2}CH_2NH(C=O)C(CH_2CH=CH_2)_3 \quad (X12\text{-}3)$$

$$\underline{CF_3}CF_2O-(CF_2CF_2CF_2CF_2OCF_2CF_2O)_o-\\CF_2CF_2O-CF_2CF_2\underline{CF_2}CH_2NH(C=O)C\\(CH_2CH=CH_2)_3 \quad (X12\text{-}4)$$

NMR spectrum of compound (X12-3):
$^1$H-NMR: 6.1 (2H), 5.8 (6H), 5.2 (12H), 4.1 (4H), 2.4 (12H)
$^{19}$F-NMR: −83 (44F), −87 (44F), −120 (4F), −124 (44F)

Preparation Example 12-4

Into a 50 mL eggplant flask the system in which was replaced with nitrogen, 1.0 g of the fraction (C12-3a) obtained in Preparation Example 12-3, 0.003 g of a xylene solution (platinum content: 3 mass %) of a platinum/1,3-divinyl-1,1,3,3-tetramethyldisiloxane complex, 0.001 g of aniline and 1.0 g of AC-6000 were added, and then 0.21 g of trimethoxysilane was added, followed by stirring at 40° C. overnight. The solvent was distilled off, and 1.2 g (yield: 100%) of mixture C(K-1a).

Further, mixtures (CK-1b), (CK-1c) and (CK-1d) were obtained in the same manner as the production of the mixture (CK-1a) except that the fraction (C12-3b), (C12-3c) or (C12-3d) was used instead of the fraction (C12-3a).

The respective mixtures contained compound (1-K) and compound (2-K).

Using the respective mixtures, the ratio 1 was obtained in the same manner as in Preparation Example 3-5 by $^{19}$F-NMR. The groups underlined in the formulae are groups measured by $^{19}$F-NMR.

Ratio 1 in mixture (CK-1a)=0.18
Ratio 1 in mixture (CK-1b)=0.09
Ratio 1 in mixture (CK-1c)=0.04
Ratio 1 in mixture (CK-1d)=0.004

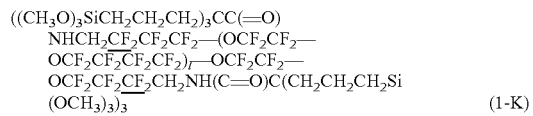

(1-K)

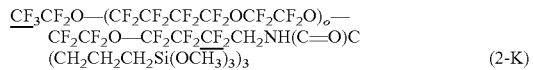

(2-K)

NMR spectrum of compound (1-K):
$^1$H-NMR: 6.0 (2H), 4.1 (4H), 3.6 (54H), 1.7 (12H), 1.4 (12H), 0.7 (12H)
$^{19}$F-NMR: −83 (44F), −87 (44F), −120 (4F), −124 (44F)
The average of the number I of units was 10.

Ex. 1 to 16

The mixture obtained in each of Preparation Examples and Novec-7200 (trade name, manufactured by 3M, $C_4F_9OC_2H_5$, boiling point: 76° C.) as a solvent were mixed in the mixing ratio as identified in Table 1 to obtain compositions in Ex. 1 to 16.

Ex. 17 to 24

The compound obtained in each of Preparation Examples and Novec-7200 as an organic solvent were mixed in the mixing ratio as identified in Table 2 to obtain compositions in Ex. 17 to 24.

Ex. 25 to 32

The compound obtained in each of Preparation Examples and Novec-7200 as an organic solvent were mixed in the mixing ratio as identified in Table 3 to obtain compositions in Ex. 25 to 30.

Further, the mixture obtained in each of Preparation Examples, the compound obtained in each of Preparation Examples and Novec-7200 as an organic solvent were mixed in the mixing ratio as identified in Table 3 to obtain compositions in Ex. 31 and 32.

Ex. 33 to 36

The mixture obtained in Preparation Example 12 and Novec-7200 (trade name, manufactured by 3M, $C_4F_9OC_2H_5$, boiling point: 76° C.) as an organic solvent were mixed in the mixing ratio as identified in Table 4 to obtain compositions in Ex. 33 to 36.

[Preparation of Evaluation Sample]

Using each of the obtained compositions, by the following dry coating method or wet coating method, a surface treatment was conducted on a substrate (chemically tempered glass) to obtain an evaluation sample (article) comprising the substrate and a surface layer formed on the surfaced of the substrate.

(Dry Coating Method)

The dry coating on the substrate was conducted by using a vacuum deposition apparatus (manufactured by ULVAC Co., VTR-350M). Specifically, 0.5 g of the composition obtained in each Ex. was filled in a boat made of molybdenum in the vacuum deposition apparatus, and inside of the vacuum deposition apparatus was evacuated of air to a level of at most $1 \times 10^{-3}$ Pa. The boat on which the composition was placed was heated at a temperature raising rate of at most 10° C./min, and at the time when the vapor deposition rate by a quartz oscillator film thickness meter exceeded 1 nm/sec, the shutter was opened to initiate film deposition on the surface of the substrate. When the film thickness became about 50 nm, the shutter was closed to terminate film deposition on the surface of the substrate. The substrate on which the compound in the composition was deposited, was subjected to heat treatment at 200° C. for 30 minutes, followed by washing with ASAHIKLIN AK-225 (trade name, manufactured by AGC Inc.) to obtain an evaluation sample (article) having a surface layer on the surface of the substrate.

(Wet Coating Method)

The substrate was dipped in each composition and allowed to stand for 30 minutes, whereupon the substrate was taken out (dip coating method). The coating film was dried at 200° C. for 30 minutes and washed with AK-225, to obtain an evaluation sample (article) having a surface layer on the surface of the substrate.

The results of evaluation of the compositions are shown in Tables 1 to 4.

TABLE 1

| Ex. | | | 1 | 2 | 3 | 4 | 5 | 6 | 7 | 8 |
|---|---|---|---|---|---|---|---|---|---|---|
| Composition | Mixture | Type of mixture | (CB-1a) | (CB-1b) | (CB-1c) | (CB-1d) | (CB-2a) | (CB-2b) | (CB-2c) | (CB-2d) |
| | | Type of compound (1) | (1-A) | (1-A) | (1-A) | (1-A) | (1-B) | (1-B) | (1-B) | (1-B) |
| | | Type of compound (2) | (2-A) | (2-A) | (2-A) | (2-A) | (2-B) | (2-B) | (2-B) | (2-B) |
| | | Content of mixture (mass %) | 10 | 10 | 10 | 10 | 10 | 10 | 10 | 10 |
| | Organic solvent | Content (mass %) | 90 | 90 | 90 | 90 | 90 | 90 | 90 | 90 |
| | | Ratio 1 | 0.12 | 0.08 | 0.06 | 0.002 | 0.17 | 0.11 | 0.04 | 0.001 |
| Dry coating | Initial contact angle | Water | ○ | ○ | ○ | ○ | ○ | ○ | ○ | ○ |
| | Sliding resistance | | X | ◎ | ◎ | ◎ | X | X | ◎ | ◎ |
| | Abrasion resistance | | ◎ | ◎ | ◎ | ◎ | ◎ | ◎ | ◎ | ◎ |
| Wet coating | Initial contact angle | Water | ○ | ○ | ○ | ○ | ○ | ○ | ○ | ○ |
| | Sliding resistance | | X | ◎ | ◎ | ◎ | X | X | ◎ | ◎ |
| | Abrasion resistance | | ◎ | ◎ | ◎ | ◎ | ◎ | ◎ | ◎ | ◎ |

TABLE 1-continued

| Ex. | | | 9 | 10 | 11 | 12 | 13 | 14 | 15 | 16 |
|---|---|---|---|---|---|---|---|---|---|---|
| Composition | Mixture | Type of mixture | (CC-1a) | (CC-1b) | (CC-1c) | (CC-1d) | (CC-2a) | (CC-2h) | (CC-2c) | (CC-2d) |
| | | Type of compound (1) | (1-C) | (1-C) | (1-C) | (1-C) | (1-D) | (1-D) | (1-D) | (1-D) |
| | | Type of compound (2) | (2-C) | (2-C) | (2-C) | (2-C) | (2-D) | (2-D) | (2-D) | (2-D) |
| | | Content of mixture (mass %) | 10 | 10 | 10 | 10 | 10 | 10 | 10 | 10 |
| | Organic solvent | Content (mass %) | 90 | 90 | 90 | 90 | 90 | 90 | 90 | 90 |
| | | Ratio 1 | 0.11 | 0.06 | 0.05 | 0.003 | 0.13 | 0.09 | 0.06 | 0.005 |
| Dry coating | Initial contact angle | Water | ○ | ○ | ○ | ○ | ○ | ○ | ○ | ○ |
| | Sliding resistance | | X | ◎ | ◎ | ◎ | X | ○ | ◎ | ◎ |
| | Abrasion resistance | | ◎ | ◎ | ◎ | ◎ | ◎ | ◎ | ◎ | ◎ |
| Wet coating | Initial contact angle | Water | ○ | ○ | ○ | ○ | ○ | ○ | ○ | ○ |
| | Sliding resistance | | X | ◎ | ◎ | ◎ | X | ◎ | ◎ | ◎ |
| | Abrasion resistance | | ◎ | ◎ | ◎ | ◎ | ◎ | ◎ | ◎ | ◎ |

TABLE 2

| Ex. | | | 17 | 18 | 19 | 20 | 21 | 22 | 23 | 24 |
|---|---|---|---|---|---|---|---|---|---|---|
| Composition | Compound (1) | Type | (1-F) | (1-F) | (1-F) | (1-F) | (1-G) | (1-G) | (1-G) | (1-G) |
| | | Content (mass %) | 2 | 1.5 | 1 | 0.5 | 3 | 2 | 1.5 | 0.5 |
| | Compound (2) | Type | (2-E) | (2-E) | (2-E) | (2-E) | (2-F) | (2-F) | (2-F) | (2-F) |
| | | Content (mass %) | 8 | 8.5 | 9 | 9.5 | 7 | 8 | 8.5 | 9.5 |
| | Organic solvent | Content (mass %) | 90 | 90 | 90 | 90 | 90 | 90 | 90 | 90 |
| | | Ratio 1 | 0.11 | 0.08 | 0.05 | 0.03 | 0.18 | 0.12 | 0.09 | 0.03 |
| Dry coating | Initial contact angle | Water | ○ | ○ | ○ | ○ | ○ | ○ | ○ | ○ |
| | Sliding resistance | | X | ○ | ◎ | ◎ | X | X | ◎ | ◎ |
| | Abrasion resistance | | ◎ | ◎ | ◎ | ◎ | ◎ | ◎ | ◎ | ◎ |
| Wet coating | Initial contact angle | Water | ○ | ○ | ○ | ○ | ○ | ○ | ○ | ○ |
| | Sliding resistance | | X | ○ | ◎ | ◎ | X | X | ◎ | ◎ |
| | Abrasion resistance | | ◎ | ◎ | ◎ | ◎ | ◎ | ◎ | ◎ | ◎ |

TABLE 3

| Ex. | | | 25 | 26 | 27 | 28 | 29 | 30 | 31 | 32 |
|---|---|---|---|---|---|---|---|---|---|---|
| Composition | Mixture | Type of mixture | — | — | — | — | — | — | (CB-2d) | (CB-2d) |
| | | Compound (1) | — | — | — | — | — | — | (1-B) | (1-B) |
| | | Compound (2) | — | — | — | — | — | — | (2-B) | (2-B) |
| | | Content of mixture (mass %) | — | — | — | — | — | — | 3 | 3 |
| | Compound (1) | Type | — | (1-E) | (1-E) | — | (1-E) | (1-E) | — | — |
| | | Content (mass %) | — | 0.5 | 0.3 | — | 1 | 0.6 | — | — |
| | Compound (2) | Type | (2-G) | (2-G) | (2-G) | (2-H) | (2-H) | (2-H) | (2-H) | (2-H) |
| | | Content (mass %) | 10 | 9.5 | 9.5 | 10 | 9 | 9 | 7 | 6 |
| | Compound (3) | Type | — | — | (3-A) | — | — | (3-A) | — | (3-A) |
| | | Content (mass %) | — | — | 0.2 | — | — | 0.4 | — | 1 |
| | Organic solvent | Content (mass %) | 90 | 90 | 90 | 90 | 90 | 90 | 90 | 90 |
| | | Ratio 1 or 2 | 0 | 0.04 | 0.06 | 0 | 0.07 | 0.11 | 0.0003 | 0.07 |
| Dry coating | Initial contact angle | Water | ○ | ○ | ○ | ○ | ○ | ○ | ○ | ○ |
| | Sliding resistance | | ◎ | ◎ | ◎ | ◎ | ◎ | X | ◎ | ◎ |
| | Abrasion resistance | | X | ◎ | ◎ | X | ◎ | ◎ | X | ◎ |
| Wet coating | Initial contact angle | Water | ○ | ○ | ○ | ○ | ○ | ○ | ○ | ○ |
| | Sliding resistance | | ◎ | ◎ | ◎ | ◎ | ◎ | X | ◎ | ◎ |
| | Abrasion resistance | | X | ◎ | ◎ | X | ◎ | ◎ | X | ◎ |

TABLE 4

| Ex. | | | 33 | 34 | 35 | 36 |
|---|---|---|---|---|---|---|
| Composition | Mixture | Type of mixture | (CK-1a) | (CK-1b) | (CK-1c) | (CK-1d) |
| | | Compound (1) | (2-K) | (2-K) | (2-K) | (2-K) |
| | | Compound (2) | (1-K) | (1-K) | (1-K) | (1-K) |

TABLE 4-continued

| | | Ex. | 33 | 34 | 35 | 36 |
|---|---|---|---|---|---|---|
| | | Content of mixture (mass %) | 10 | 10 | 10 | 10 |
| | Organic solvent | Content (mass %) | 90 | 90 | 90 | 90 |
| | | Ratio 1 | 0.18 | 0.09 | 0.04 | 0.004 |
| Dry coating | Initial contact angle | Water | ○ | ○ | ○ | ○ |
| | Sliding resistance | | X | ◎ | ◎ | ◎ |
| | Abrasion resistance | | ◎ | ◎ | ◎ | ◎ |
| Wet coating | Initial contact angle | Water | ○ | ○ | ○ | ○ |
| | Sliding resistance | | X | ◎ | ◎ | ◎ |
| | Abrasion resistance | | ◎ | ◎ | ◎ | ◎ |

As shown in Tables 1 to 4, it was found that by using the composition which satisfies the ratio 1 or 2, it is possible to form a surface layer excellent in abrasion resistance and sliding resistance (Ex. 2 to 4, 7, 8, 10 to 12, 14 to 16, 18 to 20, 23, 24, 26, 27, 29, 32 and 34 to 36).

Whereas it was found that by using the composition which satisfies neither ratio 1 nor 2, the resulting surface layer is inferior in abrasion resistance or sliding resistance (Ex. 1, 5, 6, 9, 13, 17, 21, 22, 25, 28, 30, 31 and 33).

INDUSTRIAL APPLICABILITY

The composition of the present invention is useful for various applications for which it is required to impart water/oil repellency. For example, it may be used for a display input device such as a touch panel, a transparent glass or transparent plastic member, a lens of eyeglasses or the like, a kitchen antifouling member, a water repellent moisture proof member or antifouling member of electronic device, a heat exchanger or a battery, a toiletry antifouling member, a member which requires liquid repellency while conducting electricity, a water repellent/waterproof/water sliding member of a heat exchanger, or a surface low-friction member for a vibrating strainer or the inside of a cylinder, etc. More specific examples of application include a front protective plate, an antireflection plate, a polarizing plate, an antiglare plate or a surface thereof having an antireflection film, of a display, an apparatus having a display input device of which the screen is operated by human fingers or hands, such as a touch panel sheet or a touch panel display of an apparatus such as a mobile phone (e.g. a smartphone), a personal digital assistant, a gaming machine or a remote controller (for example, glass or film to be used for e.g. display portion, or glass or film to be used for exterior member other than the display portion). In addition, a decorative building material for restroom, bathroom, lavatory, kitchen and the like, a waterproof member for a wiring board, a water repellent/waterproof/water sliding member of a heat exchanger, a water repellent member of a solar cell, a waterproof/water repellent member of a printed wiring board, a waterproof/water repellent member of an electronic equipment casing or an electronic member, an insulating property-improving member of a power transmission line, a waterproof/water repellent member of a filter, a waterproof member of an electromagnetic wave absorption material or an acoustic material, an antifouling member for bathroom, kitchen instrument and toiletry, a surface low-friction member of a vibrating strainer or the inside of a cylinder, a surface protective member of a machine component, a vacuum apparatus component, a bearing component, a member for a transport such as an automobile, an industrial tool, etc. may be mentioned.

This application is a continuation of PCT Application No. PCT/JP2020/004645, filed on Feb. 6, 2020, which is based upon and claims the benefit of priority from Japanese Patent Application No. 2019-023690 filed on Feb. 13, 2019. The contents of those applications are incorporated herein by reference in their entireties.

What is claimed is:

1. A composition, comprising:
a compound of formula (1), $R^{f1}-(OX^1)_{m1}-O-R^{f2}-Y^1-[Si(R^1)_{n1}L^1_{3-n1}]_{g1}$; and
a compound of formula (2), $[L^2_{3-n2}(R^2)_{n2}Si]_{g2}-Y^2-R^{f3}-(OX^2)_{m2}-O-R^{f4}-Y^3-[Si(R^3)_{n3}L^3_{3-n3}]_{g3}$,
wherein the ratio of the number of moles of $-CF_3$ in $R^{f1}$ in the formula (1) to the total of the number of moles of $-CF_2-$ closest to $Y^1$ in $R^{f2}$ in the formula (1), the number of moles of $-CF_2-$ closest to $Y^2$ in $R^{f3}$ in the formula (2) and the number of moles of $-CF_2-$ closest to $Y^3$ in $R^{f4}$ in the formula (2), is from 0.001 to 0.1, in the formula (1), $R^{f1}$ is a linear perfluoroalkyl group, $X^1$ is a fluoroalkylene group having at least one fluorine atom, $R^{f2}$ is a fluoroalkylene group having a group represented by $-CF_2-$, $Y^1$ is a (g1+1) valent linking group having no fluorine atom, $R^1$ is a monovalent hydrocarbon group, $L^1$ is a hydrolyzable group or a hydroxy group, m1 is an integer of at least 2, n1 is an integer of from 0 to 2, g1 is 2 or 3, and $Y^1-[Si(R^1)_{n1}L^1_{3-n1}]_{g1}$ is $-[C(O)N(R^d)]_{s4}-Q^{a4}-(O)_{t4}-C[-(O)_{u4}-Q^{b4}-Si(R^1)_{n1}L^1_{3-n1}]_{3-w1}(-R^{11})_{w1}$, where $R^1$ is a monovalent hydrocarbon group, $L^1$ is a hydrolyzable group or a hydroxy group, n1 is an integer of from 0 to 2, $R^d$ is a hydrogen atom or an alkyl group, s4 is 0 or 1, $Q^{a4}$ is a single bond or an alkylene group which may have an etheric oxygen atom, t4 is 0 or 1, provided that when $Q^{a4}$ is a single bond t4 is 0, u4 is 0 or 1, $Q^{b4}$ is an alkylene group, and the alkylene group may have $-O-$, or $-C(O)N(R^d)-$, w1 is 0 or 1, $R^{11}$ is an alkyl group, $Q^{a5}$ is an alkylene group which may have an etheric oxygen atom, and in the formula $L^2$ and $L^3$ are each independently a hydrolyzable group or a hydroxy group, $R^2$ and $R^3$ are each independently a monovalent hydrocarbon group, $Y^2$ is a (g2+1) valent linking group having no fluorine atom, $R^{f3}$ and $R^{f4}$ are each independently a fluoroalkylene group having a group represented by $-CF_2-$, $X^2$ is a fluoroalkylene group having at least one fluorine atom, $Y^3$ is a (g3+1) valent linking group having no fluorine atom, n2 and n3 are each independently an integer of from 0 to 2, g2 and g3 are each independently an integer of at least 1, and m2 is an integer of at least 2.

2. The composition according to claim 1, wherein $R^{f1}$ is a $C_{1-6}$ linear perfluoroalkyl group, $(OX^1)_{m1}$ is a poly(oxyfluoroalkylene) chain composed mainly of units based on a $C_{1-6}$ oxyperfluoroalkylene group, and $R^{f2}$ is a $C_{1-6}$ perfluoroalkylene group.

3. The composition according to claim 2, further comprising:
a liquid medium.

4. The composition according to claim 3, wherein the liquid medium contains an organic solvent, and the organic solvent has a boiling point of from 35 to 250° C.

5. The composition according to claim 3, wherein the liquid medium contains a fluorinated organic solvent.

6. The composition according to claim 1, wherein $(OX^2)_{m2}$ is a poly(oxyfluoroalkylene) chain composed mainly of units based on a $C_{1-6}$ oxyperfluoroalkylene group, and $R^{f3}$ and $R^{f4}$ are each independently a $C_{1-6}$ perfluoroalkylene group.

7. The composition according to claim 6, further comprising:
a liquid medium.

8. The composition according to claim 1, wherein m1 and m2 are each independently an integer of from 2 to 200.

9. The composition according to claim 1, wherein g2 and g3 are each independently an integer of from 2 to 4.

10. The composition according to claim 1, further comprising:
a liquid medium.

11. The composition according to claim 10, wherein the liquid medium contains an organic solvent, and the organic solvent has a boiling point of from 35 to 250° C.

12. The composition according to claim 10, wherein the liquid medium contains a fluorinated organic solvent.

13. An article, comprising:
a substrate; and
a surface layer comprising the composition of claim 1 on the substrate.

14. A composition, comprising:
a compound of formula (1),

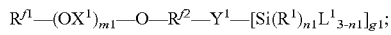

a compound of formula (2),

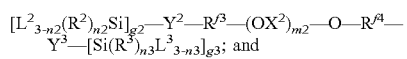

a compound of formula (3),

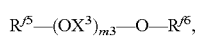

wherein the ratio of the total of the number of moles of —$CF_3$— in $R^{f1}$ in the formula (1), the number of moles of —$CF_3$— in $R^{f5}$ in the formula (3) and the number of moles of —$CF_3$— in $R^{f6}$ in the formula (3) to the total of the number of moles of —$CF_2$— closest to $Y^1$ in $R^{f2}$ in the formula (1), the number of moles of —$CF_2$— closest to $Y^2$ in $R^{f3}$ in the formula (2) and the number of moles of —$CF_2$— closest to $Y^3$ in $R^{f4}$ in the formula (2), is from 0.001 to 0.1, in the formula $R^{f1}$ is a linear perfluoroalkyl group, $X^1$ is a fluoroalkylene group having at least one fluorine atom, $R^{f2}$ is a fluoroalkylene group having a group represented by —$CF_2$—, $Y^1$ is a (g1+1) valent linking group having no fluorine atom, $R^1$ is a monovalent hydrocarbon group, $L^1$ is a hydrolyzable group or a hydroxy group, m1 is an integer of at least 2, n1 is an integer of from 0 to 2, g1 is 2 or 3, and $Y^1$-[Si$(R^1)_{n1}L^1_{3-n1}]_{g1}$ is —[C(O)N($R^d$)]$_{s4}$-$Q^{a4}$-(O)$_{t4}$—C[—(O)$_{u4}$-$Q^{b4}$-Si$(R^1)_{n1}L^1_{3-n1}$]$_{3-w1}$(—$R^{11}$)$_{w1}$, where $R^1$ is a monovalent hydrocarbon group, $L^1$ is a hydrolyzable group or a hydroxy group, n1 is an integer of from 0 to 2, Rd is a hydrogen atom or an alkyl group, s4 is 0 or 1, $Q^{a4}$ is a single bond or an alkylene group which may have an etheric oxygen atom, t4 is 0 or 1, provided that when $Q^{a4}$ is a single bond t4 is 0, u4 is 0 or 1, $Q^{b4}$ is an alkylene group, and the alkylene group may have —O—, or —C(O)N($R^d$)—, w1 is 0 or 1, $R^{11}$ is an alkyl group, in the formula (2), $L^2$ and $L^3$ are each independently a hydrolyzable group or a hydroxy group, $R^2$ and $R^3$ are each independently a monovalent hydrocarbon group, $Y^2$ is a (g2+1) valent linking group having no fluorine atom, $R^{f3}$ and $R^{f4}$ are each independently a fluoroalkylene group having a group represented by —$CF_2$—, $X^2$ is a fluoroalkylene group having at least one fluorine atom, $Y^3$ is a (g3+1) valent linking group having no fluorine atom, n2 and n3 are each independently an integer of from 0 to 2, g2 and g3 are each independently an integer of at least 1, and m2 is an integer of at least 2, in the formula (3), $R^{f5}$ and $R^{f6}$ are each independently a linear perfluoroalkyl group, $X^3$ is a fluoroalkylene group having at least one fluorine atom, and m3 is an integer of at least 2.

15. The composition according to claim 14, wherein $R^{f1}$ is a $C_{1-6}$ linear perfluoroalkyl group, $(OX^1)_{m1}$ is a poly(oxyfluoroalkylene) chain composed mainly of units based on a $C_{1-6}$ oxyperfluoroalkylene group, and $R^{f2}$ is a $C_{1-6}$ perfluoroalkylene group.

16. The composition according to claim 14, wherein $(OX^2)_{m2}$ is a poly(oxyfluoroalkylene) chain composed mainly of units based on a $C_{1-6}$ oxyperfluoroalkylene group, and $R^{f3}$ and $R^{f4}$ are each independently a $C_{1-6}$ perfluoroalkylene group.

17. The composition according to claim 14, wherein $(OX^3)_{m3}$ is a poly(oxyfluoroalkylene) chain composed mainly of units based on a $C_{1-6}$ oxyperfluoroalkylene group, and $R^{f5}$ and $R^{f6}$ are each independently a $C_{1-6}$ linear perfluoroalkyl group.

18. The composition according to claim 14, wherein g2 and g3 are each independently an integer of from 2 to 4.

19. The composition according to claim 14, wherein m1, m2 and m3 are each independently an integer of from 2 to 200.

20. An article, comprising:
a substrate; and
a surface layer comprising the composition of claim 14 on the substrate.

* * * * *